US009473574B2

(12) United States Patent
Vandwalle et al.

(10) Patent No.: US 9,473,574 B2
(45) Date of Patent: Oct. 18, 2016

(54) SYNCHRONIZATION OF DEVICES IN A PEER-TO-PEER NETWORK ENVIRONMENT

(71) Applicant: Apple Inc., Cupertino, CA (US)

(72) Inventors: Pierre B. Vandwalle, Sunnyvale, CA (US); Christiaan A. Hartman, San Jose, CA (US); Robert Stacey, Portland, OR (US); Peter N. Heerboth, San Jose, CA (US); Tito Thomas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 522 days.

(21) Appl. No.: 13/625,766

(22) Filed: Sep. 24, 2012

(65) Prior Publication Data
US 2013/0132501 A1    May 23, 2013

Related U.S. Application Data

(60) Provisional application No. 61/561,736, filed on Nov. 18, 2011, provisional application No. 61/586,664, filed on Jan. 13, 2012, provisional application No. 61/666,547, filed on Jun. 29, 2012.

(51) Int. Cl.
*G06F 15/16* (2006.01)
*H04L 29/08* (2006.01)
*H04W 4/08* (2009.01)

(52) U.S. Cl.
CPC ......... *H04L 67/104* (2013.01); *H04L 67/1051* (2013.01); *H04W 4/08* (2013.01)

(58) Field of Classification Search
CPC ............ H04L 67/1095; H04L 67/104; H04L 67/1068; H04L 67/325; G06F 17/30575; G08C 19/16; H04J 3/0652; H04W 56/00; H04W 56/001

USPC ......................................... 709/208, 209, 248
See application file for complete search history.

(56) References Cited

U.S. PATENT DOCUMENTS 5,022,046 A    6/1991    Morrow, Jr.
6,031,863 A    2/2000    Jusa
(Continued)

FOREIGN PATENT DOCUMENTS

EP    0615364 A1    9/1994
JP    H7-58688 A    3/1995
(Continued)

OTHER PUBLICATIONS

Chung, S.H. et al., "The Design of Outsourcing Planning for Semiconductor Backend Turnkey Service," *Fourth International Conference on Networked Computing and Advanced Information Management*, IEEE Computer Society, pp. 701-706 (2008).
(Continued)

*Primary Examiner* — Edward Kim
(74) *Attorney, Agent, or Firm* — Sterne, Kessler, Goldstein & Fox P.L.L.C.

(57) ABSTRACT

A system, apparatus and method for synchronizing devices in a peer-to-peer communication environment. Devices select a master to facilitate their synchronization, and rendezvous according to a schedule of availability windows broadcast by the master. Devices may attend some or all of the availability windows, during which they may send and receive unicast and/or multicast messages. Individual devices conserve power by being automatically synchronized instead of having to individually discover other devices and services, and can power off their radios without sacrificing discoverability. Synchronization and peer-to-peer communication as provided herein coexists with other device demands, such as Bluetooth® operations, infrastructure-based communications and so on.

18 Claims, 15 Drawing Sheets

(56) References Cited

U.S. PATENT DOCUMENTS

| | | | |
|---|---|---|---|
| 6,192,230 B1 | 2/2001 | van Bokhorst et al. | |
| 6,446,092 B1 | 9/2002 | Sutter | |
| 7,522,639 B1 | 4/2009 | Katz | |
| 7,675,869 B1 | 3/2010 | Anker et al. | |
| 7,849,150 B2 | 12/2010 | Loeebbert et al. | |
| 7,920,881 B2 | 4/2011 | Fullam | |
| 7,941,564 B2* | 5/2011 | Gebhardt | H04N 7/088 709/217 |
| 7,987,491 B2 | 7/2011 | Reisman | |
| 8,190,680 B2* | 5/2012 | Spilo | H04N 5/76 345/504 |
| 8,239,479 B2 | 8/2012 | Sagar et al. | |
| 8,570,898 B1 | 10/2013 | Kopikare et al. | |
| 8,699,406 B1* | 4/2014 | Charles | H04L 7/048 370/324 |
| 8,798,019 B2 | 8/2014 | Saito et al. | |
| 2002/0053985 A1 | 5/2002 | Nesbitt | |
| 2002/0065919 A1 | 5/2002 | Taylor | |
| 2002/0133631 A1 | 9/2002 | Yun | |
| 2002/0178292 A1 | 11/2002 | Mushkin et al. | |
| 2003/0169722 A1 | 9/2003 | Petrus et al. | |
| 2003/0172179 A1* | 9/2003 | del Prado Pavon | H04J 3/0655 709/236 |
| 2004/0010623 A1* | 1/2004 | Sher | H04L 65/80 709/248 |
| 2004/0136392 A1 | 7/2004 | Diachina et al. | |
| 2004/0223466 A1 | 11/2004 | Schrader et al. | |
| 2004/0255001 A1 | 12/2004 | Oh et al. | |
| 2005/0079883 A1 | 4/2005 | Khawand | |
| 2006/0190521 A1 | 8/2006 | Kojima | |
| 2006/0190553 A1 | 8/2006 | Kojima | |
| 2006/0239333 A1 | 10/2006 | Albert et al. | |
| 2006/0245454 A1 | 11/2006 | Balasubramanian et al. | |
| 2006/0246947 A1 | 11/2006 | Fujii et al. | |
| 2006/0268744 A1 | 11/2006 | Sakai et al. | |
| 2006/0286975 A1 | 12/2006 | Sugitani et al. | |
| 2007/0098116 A1 | 5/2007 | Kim et al. | |
| 2007/0160055 A1 | 7/2007 | Takahashi | |
| 2007/0198740 A1 | 8/2007 | Peters et al. | |
| 2008/0040511 A1* | 2/2008 | Messer | H04L 67/1095 709/248 |
| 2008/0068217 A1 | 3/2008 | Van Wyk et al. | |
| 2008/0107218 A1 | 5/2008 | Geissler et al. | |
| 2008/0168185 A1 | 7/2008 | Robbin et al. | |
| 2008/0240072 A1 | 10/2008 | Bykovnikov | |
| 2009/0017851 A1 | 1/2009 | Li et al. | |
| 2009/0034432 A1 | 2/2009 | Bonta et al. | |
| 2009/0083441 A1* | 3/2009 | Clark | H04L 67/1095 709/248 |
| 2009/0147806 A1 | 6/2009 | Brueckheimer | |
| 2009/0172201 A1* | 7/2009 | Carmel | H04L 67/104 709/248 |
| 2009/0228732 A1 | 9/2009 | Budde | |
| 2009/0248900 A1* | 10/2009 | Marucheck | G06F 1/14 709/248 |
| 2009/0274137 A1 | 11/2009 | Hall et al. | |
| 2010/0014460 A1 | 1/2010 | Shin et al. | |
| 2010/0027526 A1 | 2/2010 | Bultan et al. | |
| 2010/0061493 A1 | 3/2010 | Takahashi et al. | |
| 2010/0097952 A1 | 4/2010 | McHenry et al. | |
| 2010/0106588 A1* | 4/2010 | Jones | G06F 3/147 705/14.24 |
| 2010/0135334 A1 | 6/2010 | Briscoe et al. | |
| 2010/0173586 A1 | 7/2010 | McHenry et al. | |
| 2010/0272083 A1 | 10/2010 | Itoh et al. | |
| 2010/0303038 A1 | 12/2010 | Krohn | |
| 2010/0305740 A1* | 12/2010 | Kent | A61F 13/15772 700/110 |
| 2010/0309021 A1* | 12/2010 | Picard | G01D 4/004 340/870.02 |
| 2011/0092245 A1 | 4/2011 | Noonan et al. | |
| 2011/0093599 A1 | 4/2011 | Baratz | |
| 2011/0095965 A1 | 4/2011 | Yoneoka et al. | |
| 2011/0153773 A1* | 6/2011 | Vandwalle | H04W 8/005 709/217 |
| 2011/0153818 A1* | 6/2011 | Vandwalle | H04L 67/16 709/224 |
| 2011/0154084 A1* | 6/2011 | Vandwalle | H04W 8/005 713/324 |
| 2011/0170527 A1 | 7/2011 | Yamamoto et al. | |
| 2011/0206032 A1 | 8/2011 | Uemura et al. | |
| 2011/0216757 A1 | 9/2011 | Michel | |
| 2011/0222515 A1 | 9/2011 | Wang et al. | |
| 2011/0289176 A1 | 11/2011 | Toyama | |
| 2011/0292786 A1 | 12/2011 | Haessler et al. | |
| 2011/0310754 A1 | 12/2011 | Laursen et al. | |
| 2012/0106428 A1 | 5/2012 | Schlicht et al. | |
| 2012/0184311 A1 | 7/2012 | Yamamoto et al. | |
| 2012/0184312 A1 | 7/2012 | Yamamoto et al. | |
| 2013/0132500 A1 | 5/2013 | Vandwalle et al. | |
| 2013/0132502 A1 | 5/2013 | Stacey et al. | |
| 2013/0185373 A1 | 7/2013 | Vandwalle et al. | |
| 2013/0336340 A1 | 12/2013 | Ando | |

FOREIGN PATENT DOCUMENTS

| | | |
|---|---|---|
| JP | 2005-6327 A | 1/2005 |
| JP | 2010-258619 A | 11/2010 |
| JP | 2010-263349 A | 11/2010 |
| JP | 2011-244151 A | 12/2011 |
| TW | 200907719 A | 2/2009 |

OTHER PUBLICATIONS

Frattasi. S. et al., "Heterogeneous Services and Architectures for Next-Generation Wireless Networks," *2nd International Symposium on Wireless Communication Systems*, IEEE, pp. 213-217 (2005).

Haartsen, J.C, "BLUETOOTH™; A new radio interface providing ubiquitous connectivity," *VTC2000*, IEEE pp. 107-111 (2000).

Han, J. et al., "Practical Considerations in the Design and Implementation of Time Synchronization Systems Using IEEE 1588," *IEEE Communications Magazine*, IEEE, pp. 164-170 (Nov. 2009).

Popovski, P. et al., "Device Discovery in Short-Range Wireless Ad Hoc Networks,"*5th International Symposium on Wireless Personal Multimedia Communications*, IEEE, pp. 1361-1365 (2002).

Texas Instruments, "AN-17281 EEE 1588 Precision Time Protocol Time.Synchronization Performance," Application Report SNLA098A, 10 pages (Oct. 2007—Revised Apr. 2013).

Wu, H. et al., "IEEE 802.11e Enhanced Distributed Channel Access (EDCA).Throughput Analysis." *IEEE International Conference on Communications*, IEEE, pp. 223-228 (2006).

English language abstract of Japanese Patent Publication No. JP 2002-186009, published Jun. 28, 2002, retrieved from http://worldwide.espacenet.com, 1 page.

\* cited by examiner

SYNCHRONIZATION OF DEVICES IN A PEER-TO-PEER NETWORK ENVIRONMENT

RELATED APPLICATION

This application claims priority to U.S. Provisional Patent Application Nos. 61/561,736 (filed 18 Nov. 2011), 61/586,664 (filed 13 Jan. 2012) and 61/666,547 (filed 29 Jun. 2012), the contents of which are herein incorporated by reference.

Further, the subject matter of the present application is related to subject matter in a co-pending non-provisional application entitled "Selection of a Master in a Peer-to-Peer Network Environment," which has application Ser. No. 13/625,752 and was filed the same date as the present application.

BACKGROUND

This invention relates to the field of communications. More particularly, a system, apparatus and methods are provided for synchronizing multiple devices within a peer-to-peer networking environment.

Peer-to-peer network protocols or technologies allow individual nodes or devices to communicate directly with other peers, and may be contrasted with infrastructure-based environments in which a required central node (e.g., a server, a router, a switch, an access point) passes communications between different nodes. One benefit of direct peer-to-peer communication is that it avoids unnecessary additional routing and processing of communication through other devices.

However, existing peer-to-peer network technologies have limitations that diminish their usability, scalability and/or performance. For example, some technologies offer only limited peer-to-peer communication capabilities because they are focused on infrastructure-based solutions and therefore require a central node. Peer-to-peer communication in these environments requires negotiation with the central node, and may not be possible between devices that do not share a common central node. Also, communications between peers may be limited by the capabilities of the central node (e.g., frequency band, bandwidth, modulation).

Because of its prominent role, a central node may become congested and thus increase communication latency and decrease communication throughput within the environment. Further, a central node acts as a single point of failure. Even if another node can take over the functions of a failed or missing central node, until that occurs the network may be severely degraded.

Some other technologies that allow for peer-to-peer communications require significant power consumption by individual nodes, which is a principal concern for devices that rely on battery power (e.g., smart phones, tablets, laptop and notebook computers). Excessive power consumption by a peer might be caused by inefficient discovery of services and/or other devices, by having to act as a central node, by inefficient use of the device's transceiver, and/or for other reasons. For example, requiring a device to continually or regularly poll or query other devices will cause it to consume significant amounts of power, especially for a wireless device travelling through different spatial regions.

Yet further, some networking technologies or protocols that support peer-to-peer communications do not coexist well with other technologies. For example, in a wireless environment, typical peer-to-peer protocols are not flexible enough to share a device's radio, antenna or frequency spectrum with other protocols or between applications (e.g., to maintain a Bluetooth® connection). Some peer-to-peer technologies also do not permit multicast communications, instead requiring a device to contact multiple peers individually, and/or do not scale well as the environment becomes more densely populated.

SUMMARY

In some embodiments of the invention, systems, apparatus and methods are provided for synchronizing multiple devices for the purpose of peer-to-peer communications. In these embodiments, the devices may be wireless devices and are logically organized into a hierarchy (e.g., a tree), not for the purpose of routing or distributing communications, but rather for synchronization of the devices so that any given device can easily rendezvous with its peers.

Master devices are responsible for facilitating and maintaining synchronization of subordinate masters and slave devices (i.e., devices that are not masters) within the master's general area. For example, within a larger environment or collection of peer devices, a subset of the devices within a local area will recognize one of the peers as a master and will synchronize with it. That master issues periodic synchronization frames to promote and maintain synchronization, and may be synchronized with a superior master. An overall top-master sets synchronization parameters for the entire environment and also issues periodic synchronization frames; subordinate masters may propagate and enforce those parameters throughout the environment.

A peer device will listen to the synchronization frames it detects and extract information from them, including synchronization parameters. Synchronization parameters will indicate where (e.g., which channel) and when (e.g., at what time) the next rendezvous will occur, which is termed an availability window. The parameters may define an entire sequence of availability windows. Individual devices may attend any or all of the windows, but may be required to attend at least one in each sequence.

During an availability window, devices can send and receive unicast and multicast messages, and can discover other devices and services. Some devices may arrange to rendezvous outside the availability window in order to exchange data (e.g., perform a file transfer).

DETAILED DESCRIPTION

Figure 1:
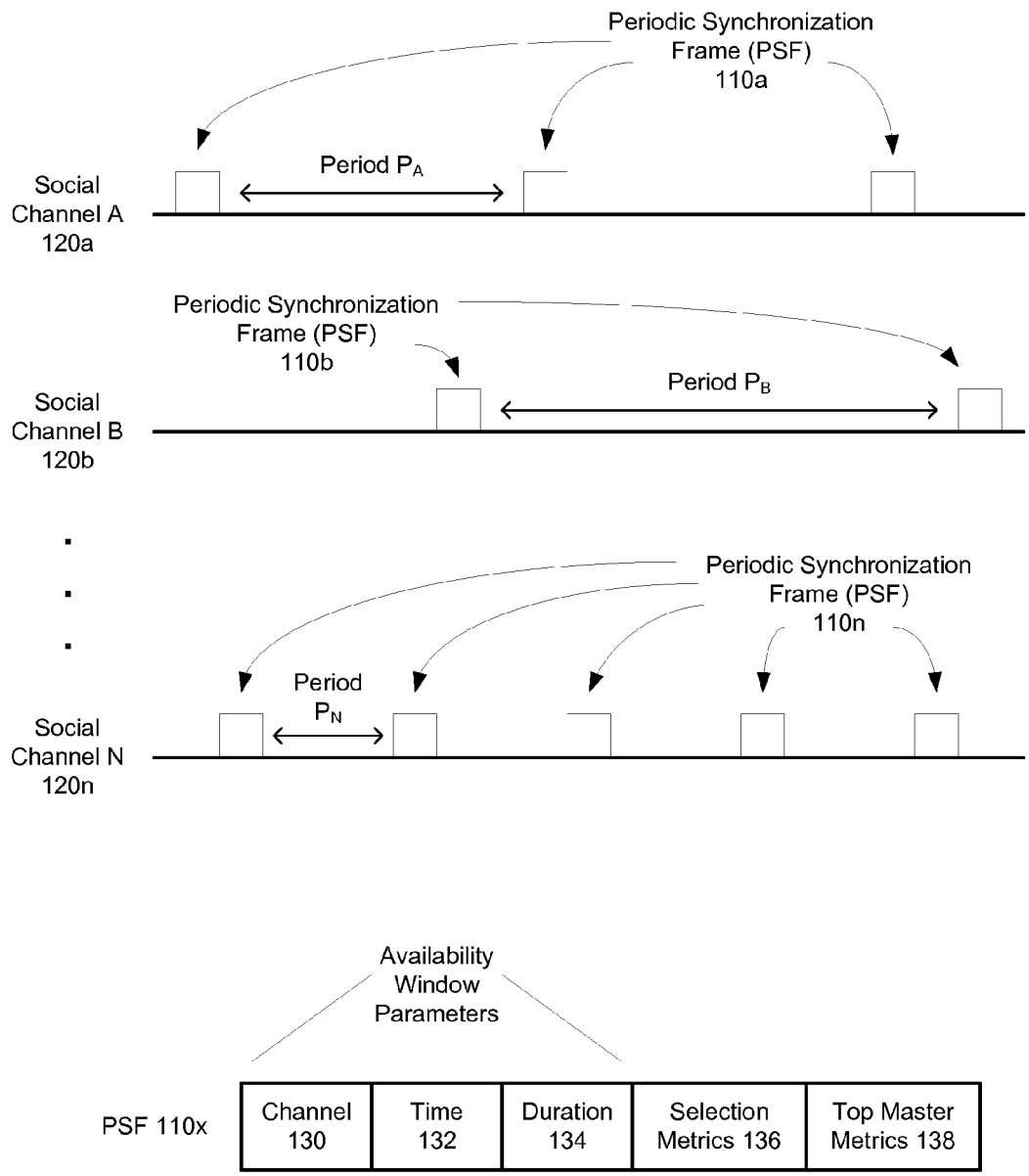
FIG. 1 depicts the use of periodic synchronization frames for achieving and maintaining synchronization among devices, according to some embodiments of the invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, systems, apparatus and methods are provided for synchronizing devices within a peer-to-peer communication environment. In these embodiments, the devices rendezvous on specified channels (e.g., 802.11 wireless channels) at specified times.

Synchronization is achieved and maintained using periodic synchronization frames that are broadcast by devices selected to be masters. A top master issues synchronization parameters that are consumed by other devices, including slave devices and subordinate masters. Subordinate masters distribute those parameters, and/or their own, to devices synchronized to them. When devices rendezvous according to the synchronization parameters, they can discover masters and other peers, can identify themselves (e.g., type of device, features, services) and can engage in unicast and/or multicast communications with other peers. They may also establish a new network or rendezvous on a different channel and at a different time.

By synchronizing the devices in this way, individual devices conserve power by not having to individually discover other devices, and can even turn off their radios outside of the required rendezvous when not in use without causing them to be undiscoverable by other devices. Thus, they use less power to discover peers and to make themselves discoverable by peers.

Introduction

A wireless communication environment may be characterized by any number of devices of the same and/or different type—such as smart phones, tablets, personal digital assistants, laptop and desktop computers and so on. Different devices will have different features, may execute different applications, may have different power levels (e.g., battery strengths), different communication needs, different loads (e.g., on a processor, on an antenna), may be heard by other devices with varying signal strengths, etc. In addition, the communication environment may be fluid, with devices continuously entering, moving through and exiting the spatial region encompassing the environment.

Some embodiments of an invention disclosed herein provide for a protocol, mechanism and/or processes for enabling devices in such an environment to communicate directly, peer-to-peer. These embodiments: promote low power consumption even while making devices and services readily discoverable; coexist with other communication technologies (e.g., Bluetooth®); support multi-band operation (e.g., 2.4 GHz and 5 GHz); avoid the throughput and latency degradation usually encountered with network infrastructure (e.g., access points), but yet are compatible with infrastructure-based technologies; easily and quickly recover if and when a device acting as a master exits the environment; and are scalable to accommodate dense environments having many devices. These and other features and advantages are described below.

In embodiments of the invention, devices are synchronized so that they rendezvous at predetermined times on predetermined channels. A period of time during which devices rendezvous is termed an availability window and, when synchronized, the devices' availability windows will be similar or even identical regarding when they occur. During an availability window, peers may exchange multicast and/or unicast data communication, and discover other devices and services. A device may extend an availability window to accommodate ongoing communication with a peer.

Parameters of one or more upcoming rendezvous (e.g., time and channel) are communicated via Periodic Synchronization Frames (PSF) broadcast on one or more social channels that the devices listen to. The devices are pre-programmed to listen on at least one social channel at least once, for a length of time equal to or greater than the period with which a master device issues the PSFs.

Therefore, when a device boots, comes online or enters an environment occupied by other devices, it will quickly learn where and when it may rendezvous with other devices. If the device does not hear a PSF, it may assume that it should act as a master and begin issuing its own PSF to enable other devices to rendezvous with it.

Once a device is synchronized, it will be advised of the master's schedule or sequence of availability windows on a periodic basis, even during an availability window in some implementations, and need not constantly listen or poll to find other devices. Therefore, the device may power off its radio when not listening for a PSF, participating in an availability window or using it for some other purpose. For example, the device may share a radio, antenna and/or other resource with another communication requirement of the device, such as an infrastructure connection or a Bluetooth® connection.

When more than one device is capable of issuing PSFs, a selection procedure is applied to determine which becomes a master and takes on responsibility for broadcasting periodic synchronization frames and maintaining device synchronization. Multiple masters may be selected, depending on the number of peer devices present, their signal strengths, signal propagation patterns, etc. As described below, the master selection process may consider virtually any relevant factor of the participating devices.

Although devices in the communication environment engage in peer-to-peer communication, without the burden of infrastructure requirements, the selection of masters will logically organize the devices into a hierarchy for purposes of synchronization. Within the hierarchy, a root or top master is responsible for overall synchronization via the synchronization parameters it advertises via PSFs. Subordinate masters will synchronize with their masters and retransmit or repackage their masters' synchronization parameters within their own PSFs, thereby extending the range of the overall synchronization.

Because the radio range of a single wireless device (e.g., the top master) is limited, having sub-masters rebroadcasting its synchronization parameters allows that device to synchronize a larger collection of devices and enables those devices to enjoy the benefits of synchronization (e.g., ready access to services and other devices within that environment).

Unlike an environment that has infrastructure requirements (e.g., an access point), because a master's principal task is simply to promulgate rendezvous parameters, loss of a master is easily rectified without an elaborate process. For example, the rendezvous schedule of the missing master will simply be maintained while a replacement is chosen, thereby keeping all devices synchronized.

Different master selection algorithms may be applied at different times and/or in different environments, but generally serve to promote any or all of these objectives: even spatial distribution of masters throughout the environment, a tuneable density of masters within the environment and control of the size of the geographic area comprising the environment.

In some embodiments of the invention, a master selection algorithm is executed regularly to ensure the most appropriate devices are appointed masters, based on various selection metrics of the devices. The selection process may also consider how many masters are already present in an area, how far away they are (e.g., based on signal strength or some other measure of distance), etc.

Synchronization of Devices

As discussed above, synchronization of devices within a wireless communication environment according to some embodiments of the invention allows them to easily discover each other, discover available services and engage in direct peer-to-peer communications (unicast and/or multicast), all while conserving power resources and coexisting with other communication processes.

Synchronization commences as soon as a device comes online or moves within range of at least one other device operating a compatible protocol, and can be maintained as long as the device is online within the spatial area covering the synchronized devices.

Through the synchronization and master selection processes, devices are automatically organized into a hierarchy, in which masters at each level, or stratum, periodically broadcast synchronization data or parameters in order to achieve and maintain synchronization among devices in an area. One mechanism for disseminating synchronization parameters is the masters' transmission of periodic synchronization frames (PSF) that are consumed by all devices synchronized to the masters and/or listening on the channels on which the PSFs are broadcast.

Periodic synchronization frames serve to convey information such as, but not limited to: a description of one or more upcoming availability windows during which synchronized devices can rendezvous, parameters of the master that transmitted the PSF, and information regarding the top master within the hierarchy of synchronized devices. In other embodiments of the invention, a PSF may include a different collection of information, but will normally include criteria identifying at least one availability window.

Formation of the hierarchy and synchronization of devices within it may be affected by configuration parameters such as, but not limited to: maximum depth of the hierarchy, periodicity of PSFs, number of masters (e.g., overall and/or within range of a given device), the selection algorithm used to select masters, selection metrics considered by the selection algorithm and others. In different embodiments of the invention, different configuration parameters may be applied.

FIG. 1 depicts the use of periodic synchronization frames for achieving and maintaining synchronization among devices, according to some embodiments of the invention.

In these embodiments, periodic synchronization frames 110 (e.g., frames 110a, 110b, 110n) are transmitted on regular bases on one or more social channels 120 (e.g., channels 120a, 120b, 120n). The periodicity of these frames may be on the order of 100 milliseconds. Different masters may transmit the frames on the same or different social channels, and any given master may use one or more social channels to carry its PSFs. Different social channels may be used by different masters in a single environment, perhaps to avoid interference with each other, because the social channel used by one master may be in use on a different master for a different purpose (e.g., an infrastructure connection), and/or for some other reason.

Although multiple social channels 120 are depicted in FIG. 1, in some implementations all masters in one environment and hierarchy may use the same social channel. Social channels and/or other channels discussed herein may be IEEE 802.11 wireless channels.

On social channels 120a, 120b 120n, respective periodic synchronization frames 110a, 110b, 110n are broadcast on periodic bases by a responsible master. Although the PSF period of each channel ($P_A$, $P_B$, $P_N$) is different in FIG. 1, in some embodiments of the invention in which multiple social channels are employed, the periodicities of two or more channels may be identical.

When transmitting a PSF, which may be on the order of 100 milliseconds in duration, the issuing master device merely needs to tune its radio to the specific channel and power it on long enough to send the PSF. It need not remain on that channel after issuing the PSF, but rather can switch to a different social channel (e.g., to prepare to transmit a PSF on a different channel) or may use its radio for some other purpose, such as attending an availability window (as described below), handling infrastructure communication, etc.

In different embodiments of the invention, a PSF may contain a subset or a superset of the elements of illustrative PSF 110x, or a completely different set of information elements. The synchronization parameters (or availability window parameters) of PSF 110x—the combination of channel 130, time 132 and duration 134—define one availability window during which synchronized devices can rendezvous. Channel 130 identifies the channel (e.g., an 802.11 wireless channel) on which they will rendezvous, time 132 identifies the time, and duration 134 indicates a minimum duration of the window.

Synchronization parameters or data of a PSF may identify any number of availability windows (zero or more). Different PSFs transmitted on the same or different social channels, and by different masters, may identify the same or different availability windows. In some embodiments, however, the synchronization parameters set by the top master (including the schedule or sequence of availability windows) are applied throughout the hierarchy.

Time element 132 of the synchronization parameters of PSF 110x may identify an absolute starting time (e.g., based on a synchronized clock, Greenwich Mean Time or some other common reference) and/or a relative time. In some embodiments of the invention, time 132 includes multiple values that a synchronizing device uses to compute the starting time of the availability window.

In these embodiments, time 132 includes a "target" timestamp configured to indicate when PSF 110x was formed and queued for transmission within the issuing master (e.g., when the PSF was placed into a transmit buffer), and an "actual" timestamp configured to indicate when the PSF was actually dispatched via the device's antenna. The PSF is considered formed as of the time a "master offset" parameter is calculated by the master.

The master offset value, also included within PSF 110x as part of time 132 or a different information element, represents the master device's internal offset to the start of the next availability window, measured from the time it releases the PSF. In other words, the master offset measures the period of time from the target timestamp to the start of the availability window, as calculated by the master.

With these values, a device that synchronizes with the master that issued PSF 110x can compute an offset to the starting time of the availability window as follows:

Offset=Master offset−(actual timestamp−target timestamp)

The synchronizing device thus receives the master offset and, from the target and actual timestamps, can measure how much of that master offset time period has elapsed; it then subtracts that elapsed period from the master offset to determine the amount of time remaining until the availability window.

Duration 134 of PSF 110x indicates the minimum amount of time, during the availability window, that the master that issued PSF 110x will be listening and therefore reachable. The duration may also apply to the synchronized devices; that is, a device that attends the window may be required to be available for at least that period of time, measured from the commencement of the window.

In some embodiments of the invention, the master may automatically extend its availability window (e.g., in increments matching duration 134 or some other time duration) as long as at least one station is communicating with it. Thus, even if multiple stations wish to communicate with the master, because the window will be extended, they may be able to do so without waiting for another availability window.

Similarly, a device that attends the availability window may extend its window as long as at least one of its peers engages it in communication. Therefore, one peer that wishes to communicate with another peer may simply issue a first set of packets, datagrams, messages or other units of communication to that other peer during an availability window. Both peers will then automatically extend their windows because of the active communication. Advantageously, this allows extensive peer-to-peer communication without saturating or monopolizing bandwidth during the availability window.

A maximum duration of the master's presence during an availability window may be specified in PSF 110x and/or may be announced during the availability window, beyond which it will not extend its window. Illustratively, the master device may need to terminate the window in order to issue another PSF, to use its radio for some other purpose, or for some other reason. As for individual devices, they may depart an availability window after duration 134 if they have nothing to communicate and if no other device communicates with it during some period of time within the window.

Returning to FIG. 1, selection metrics 136 of PSF 110x include data regarding the device that issued PSF 110x, which other devices may use to apply a process or algorithm for selecting a master. As described in a subsequent section, the selection process may consider various characteristics of a device and/or communication environment, any or all of which may be supplied in a synchronization frame or other communication issued by the device. Illustrative selection metrics include available power resources (e.g., battery strength, AC connection), processor load, stratum or depth in the environment's hierarchy, signal strength and so on.

Even after becoming a master, a device may continue to include its selection metrics 136 in PSF 110x so that any new devices joining the environment can decide whether they are better suited to be a master, or to decide with which master to synchronize. The master selection process may be executed on a regular basis, such as after every sequence of availability windows, on a fixed schedule, etc.

Top master metrics 138 include characteristics of the top master of the environment. Metrics 138 may therefore include top master data corresponding to selection metrics 136 and/or other parameters, such as address (e.g., medium access control address), name and so on. As will be seen below, by propagating top master metrics 138 throughout the peer-to-peer environment, a device at the fringe of the area or in an area overlapping multiple separate environments can determine which collection of devices to synchronize with.

In other embodiments of the invention, a PSF may include information elements other than those depicted in FIG. 1. For example, a PSF may identify an algorithm for selecting masters, constraints on masters (e.g., how many can be within range of each other), a maximum depth for the device hierarchy, a notification that a master is departing the network, etc.

Availability windows may or may not be synchronized with periodic synchronization frames; that is, they may occur at regular or irregular periods before or after the PSFs.

Although a master may have a stated period to the issuance of periodic synchronization frames, that period is flexible and there is a high tolerance for variation. A given PSF may be advanced or delayed in time because of other demands on the master device's radio, because of contention on the communication channel or for some other reason. In some implementations, PSFs may vary on the order of +/−20 milliseconds every 100 milliseconds.

Periodic synchronization frames may be transmitted opportunistically, meaning that if a master device's radio is tuned to a different channel at the time when it would ordinarily issue a PSF on a social channel, it may instead issue the PSF on its current channel. PSF broadcasts will return to their normal schedule on the social channel(s) when able.

This type of situation, wherein a PSF is sent on a non-social channel to identify a future availability window, can be very useful to a localized group of devices. Such devices likely will be associated with the same infrastructure network on the same (non-social) channel. Transmitting a PSF on this channel saves these devices the cost of a channel switch and avoids interfering with their infrastructure communications.

In the worst case, a new device tuned to the master's normal social channel may miss a limited number of PSFs. However, the master device may be tuned to a commonly used frequency (e.g., an infrastructure channel required for a particular application, as described above), and may therefore reach the same device anyway.

Figure 2:
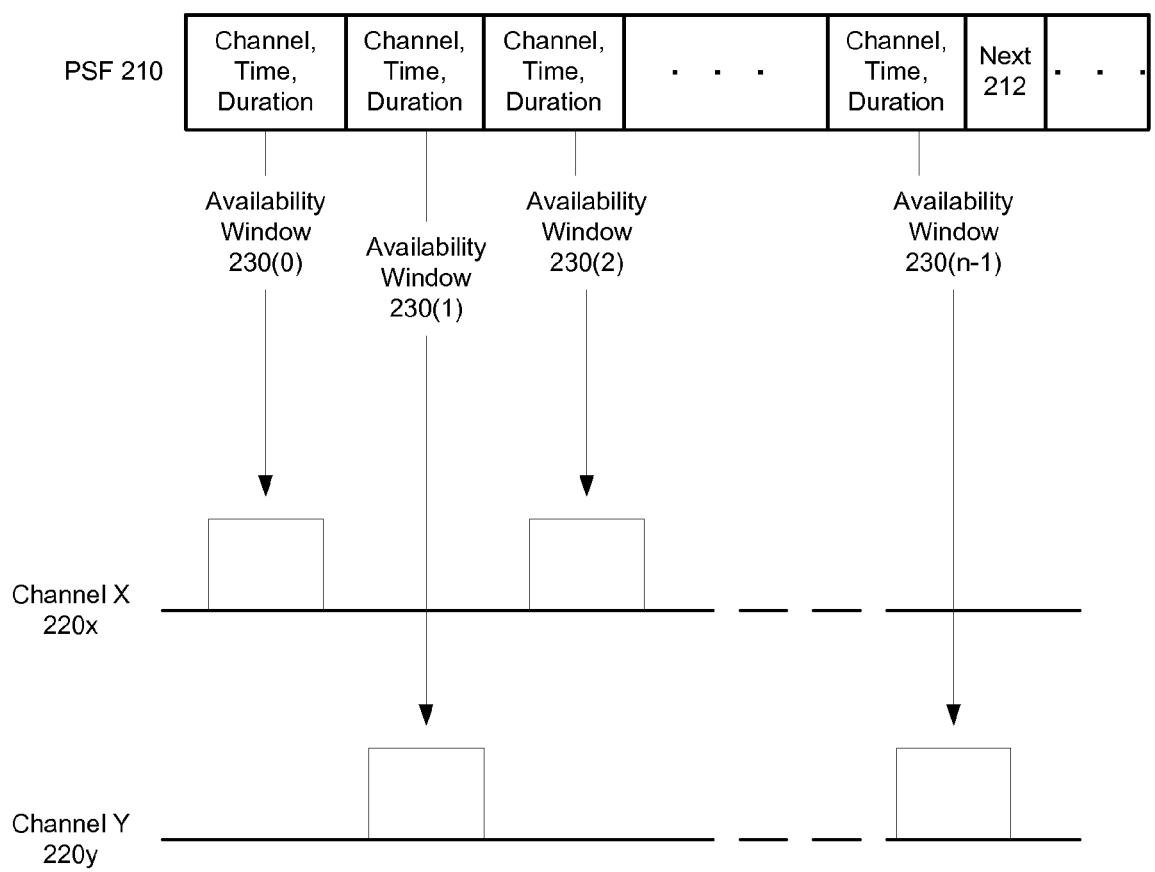
FIG. 2 is a diagram demonstrating a sequence of availability windows identified in a periodic synchronization scheme, according to some embodiments of the invention.

FIG. 2 is a diagram demonstrating a sequence of availability windows identified in a periodic synchronization scheme, according to some embodiments of the invention. All masters' availability windows may be scheduled for the same times, on the same or different channels, although this is not required of all embodiments of the invention.

Availability windows 230 of FIG. 2 are numbered and conducted as a repeating sequence. In particular, packet synchronization frame 210 comprises synchronization parameters that reveal a schedule of n availability windows, 230(0) through 230(n−1). After one iteration, the availability window sequence numbers repeat 0 through n−1. A periodic synchronization frame may define any number of windows (i.e., zero or more).

In addition to identifying the schedule for a full sequence of availability windows, a PSF may identify which availability window sequence number is next, with an information element such as element 212 of PSF 210. A periodic synchronization frame may also include other information, such as the timing information described above for helping a receiving device correctly calculate the time remaining until the next availability window.

Other information that may be included in a PSF includes the issuing master's period for sending periodic synchronization frames, and the channel or channels the PSFs will be broadcast on. This allows a peer device to know the maximum amount of time it must listen on a particular social channel in order to hear a PSF.

Availability windows scheduled by a master may or may not occur at a regular period, and may or may not be synchronized with the master's PSFs. In other words, the availability windows need not occur at identical time periods after the PSFs. An illustrative duration of time that a full sequence of availability windows occupies may be on the order of five seconds, although a specific implementation of an embodiment of the invention may employ a shorter or longer duration.

In some embodiments of the invention, there is less tolerance regarding an availability window period than there is regarding a periodic synchronization frame period, perhaps on the order of +/−100 microseconds per second (compared to +/−200 milliseconds per second for PSFs). Whereas PSFs are very short (e.g., less than 1 millisecond) but issued frequently, availability windows are relatively long (e.g., longer than 50 milliseconds) and issued infrequently (e.g., approximately one per second). PSFs may be scheduled opportunistically because of their short duration, but availability windows cannot.

Although infrequent, availability windows may monopolize a radio interface for a significant period of time; because of this, adherence to a strict schedule is advantageous, especially if other radio technologies are present (e.g., Bluetooth). Also, other (synchronized) devices are depending upon the advertised schedule of windows, which leaves less room for variation.

Therefore, in some embodiments of the invention, a PSF transmission period will have a relatively high tolerance for variation, while an availability window period has a relatively low tolerance for variation. One advantage of this strategy is that it allows for Wi-Fi contention that occurs at every periodic synchronization frame transmission. PSF transmission is only possible when the selected social channel is not in use, and contention for the channel or the radio may or may not delay issuance of the PSF. Therefore, strict scheduling of PSF transmissions would be difficult to achieve.

When a peer device first synchronizes with a master and begins attending availability windows, in the first window (and/or the first window that all devices are required to attend) it may issue a message identifying itself, providing its selection metrics, advertising its services, etc. Any devices wishing to communicate with it can then make contact.

The n availability windows advertised via PSF 210 in FIG. 2 are conducted on two different channels 220x, 220y (i.e., channel X and channel Y, respectively), which are usually not social channels, but could be. Availability windows scheduled by a master may alternatively occur on the same channel or may be distributed among more than two channels.

Although availability windows are provided as a mechanism for peer devices to discover each other and services that are offered, a device (including a master) may skip one or more windows in a sequence. For example, if a peer device needs to use its radio for some other purpose during an availability window, it may not attend that window at all, may arrive late or may leave early. The device may or may not advise a master or other devices of its absence (e.g., via a multicast message).

A device may set a "presence mode" for itself, and advertise it to its master and/or other peers, to indicate how frequently it will tune into or rendezvous with the advertised sequence of availability windows. In some implementations, a presence mode (or PM) is an integer value such as 1, 2, 4, etc. The reciprocal of the device's PM is a fraction indicating how many availability windows in a sequence it will attend. For example, if a device's PM=1, the device will attend every availability window; if its PM=2, the device will attend every window having a sequence number that is a multiple of 2 (i.e., ½ of the windows); if PM=4, it will attend every window whose sequence number is a multiple of 4 (i.e., ¼ of the windows).

Higher presence mode values allow a device to skip more windows and turn off its radio, thereby saving power. A PM value of zero may indicate that a device is always available (i.e., not just during availability windows).

In some embodiments of the invention, all synchronized devices must attend at least one availability window in its master's sequence. For example, devices may be required to synchronize during availability window 0 of each sequence. Thus, a PM value equal to the length of the availability window sequence indicates that the device will only be present during the required window.

The length of an availability window sequence is generally a power of 2 (e.g., 8, 32, 256). Sequence numbers of availability windows issued by a master begin at zero, and increase one at a time until reaching the value length−1 (e.g., 7, 31, 255), after which they repeat. A sub-master is required to adopt and repeat (in its synchronization frames) the current sequence number of its master, as well as the length of the availability window sequence. Therefore, all devices synchronized under one master will agree on which availability window has sequence number 0.

A device may attend more availability windows than its PM indicates, but by announcing its presence mode value (e.g., via a multicast message in availability window sequence number 0), other devices will know when they can interact with it. And, as described previously, as long as one other device sends a communication to a device having the maximum PM value (equal to the length of the availability window sequence), during a window attended by the receiving device, that device will extend its presence on that channel in order to conduct the communication.

Further, in some embodiments, whenever a peer device having a presence mode greater than one (or some other threshold) receives a communication, it may automatically set its presence mode to one (or some other lower value) in order to facilitate the desired communication. Yet further, a device with a low presence mode (e.g., zero or one), after receiving a multicast frame in one availability window, may repeat it in one or more subsequent windows to help get it to its peers.

A master device may have any PM value; although it sends synchronization frames at periodic intervals (even during an availability window), it may shut off its radio during an availability window when it is not sending a synchronization frame.

In some embodiments of the invention, two or more peer devices wishing to conduct a relatively extended period of communication (e.g., for file transfer, to engage in a game or other application) may establish their own synchronization for the purpose of exchanging data, parallel to the overall synchronization, but outside of scheduled availability windows. In these embodiments, one of the two or more devices may assume the role of a non-selection master, meaning that it does not participate in a master selection process as described in a following section, but is available for other devices to synchronize to (e.g., to conduct a file transfer, to play a game). Devices synchronized with a non-selection master may form a basic service set (BSS).

A non-selection master may issue synchronization frames that the other peer devices with which it will communicate will use to synchronize with the non-selection master, but which other devices in the community will ignore. Illustratively, these synchronization frames may be transmitted during an availability window or on an agreed-upon channel. A non-selection master's synchronization frames may specify that the device is a non-selection master, so that devices not needing to directly communicate with it will know that they should not synchronize with it.

A device that wants to synchronize or maintain synchronization with a community of peers may be unable to do so, perhaps because it cannot monitor the community's social channel(s), has other commitments during the scheduled availability windows, or for some other reason. In this situation, the device may become a non-selection master (and identify when it is available) to help other devices discover it. Alternatively, it may request a master to alter its synchronization schedule to accommodate the device (e.g., change the channel(s) and/or times of the master's availability windows), or may take over as master if its selection metrics allow (and then change the availability window schedule).

In some embodiments of the invention, during an availability window on a rendezvous channel a master or other device (e.g., a non-selection master) may broadcast a different type of synchronization frame called a master indication frame (MIF). In these embodiments, master indication frames provide information that help peer devices achieve or maintain synchronization—either with a master device that issues regular PSFs or with a non-selection master that devices may synchronize with to exchange data directly. A master indication frame may be sent during an availability window, but generally will not be sent on a social channel unless, for example, one is sent during an availability window that is occurring on a social channel.

A master indication frame may include any data that a periodic synchronization frame might include, and/or other information. For example, an MIF might be sent by a master to report that it will start using a different social channel for sending PSFs, might be sent by a non-selection master to report that it will have a window of availability on a particular channel at a particular time, might be sent by another device to report synchronization data it heard from some other master, etc.

When an availability window overlaps with the time a PSF would normally be sent (i.e., according to the master's PSF period), the regular PSF is sent on the channel on which the availability window is conducted (and not on the social channel). During availability windows that do not overlap with the expiration of a master's PSF period, the master may nonetheless send an MIF to ensure that devices synchronized with it have the necessary synchronization data without having to tune into a social channel for a regular PSF. However, a device may still periodically listen on one or more social channels to learn of other masters.

Because peer devices having presence mode values other than one may not attend every availability window, but must be present during availability windows having sequence number 0, a master may by default always broadcast a PSF or MIF during those windows.

It may be noted that periodic synchronization frames are sent frequently, usually outside of availability windows, in order to help non-synchronized devices synchronize with their peers. After a collection of devices is synchronized, those devices may only (or primarily) meet during relatively sparse availability windows, especially those devices that have adjusted their presence modes to use their radios less and thereby save power. To remain synchronized, these devices may rely on master indication frames sent during availability windows.

Whereas PSFs are short but frequent, MIFs are longer and less frequent, and may pack extended service and device capability payloads. In some embodiments of the invention, one or more PSFs and/or MIFs may be issued during a single availability window.

In some embodiments of the invention, devices are required to implement guard periods at the beginning of some (or all) availability windows, during which they listen and can receive communications, but do not transmit. In different embodiments of the invention, this restriction may or may not always apply to regular masters that issue regular PSFs, but generally will always apply to non-selection masters.

Figure 3:
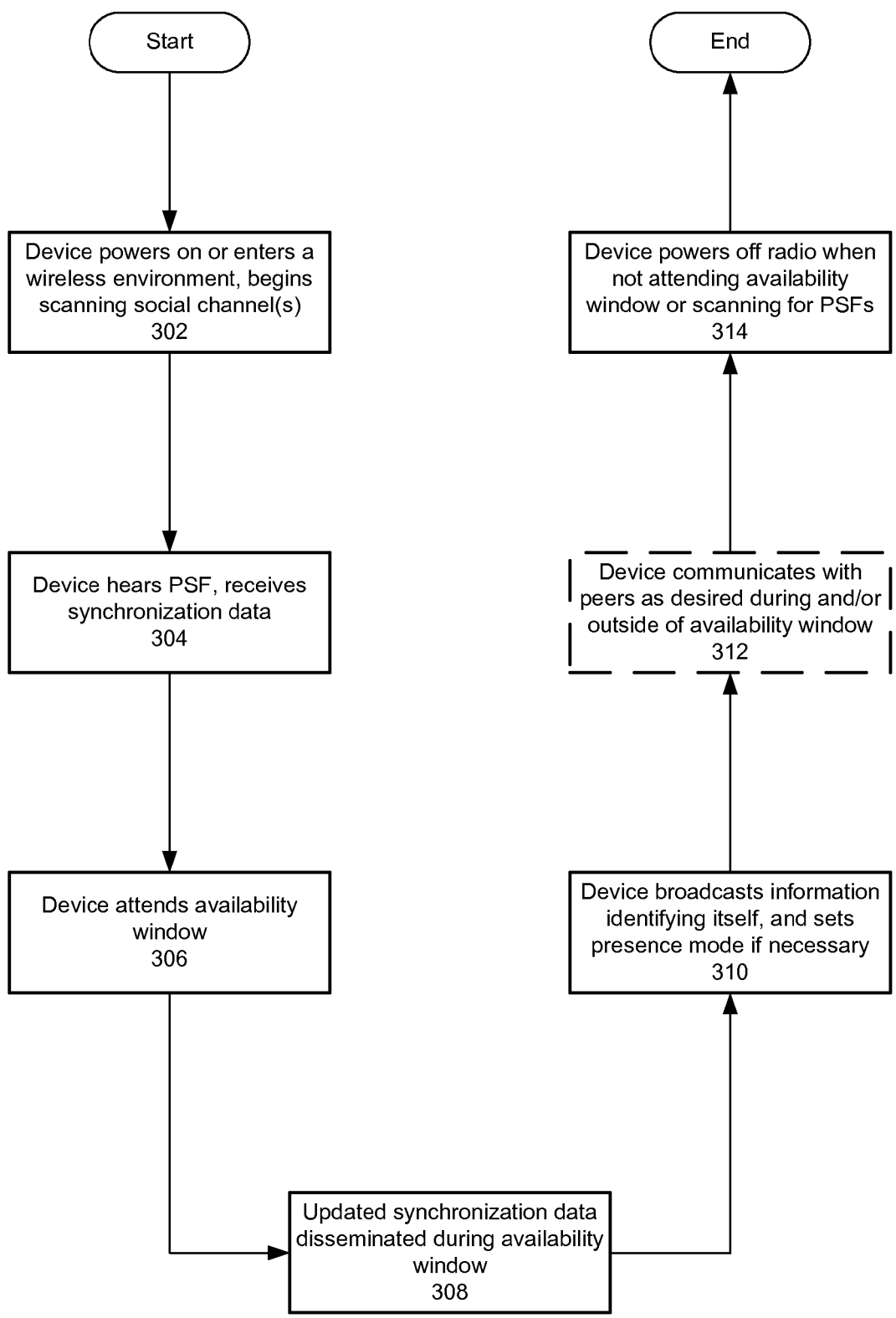
FIG. 3 is a flow chart demonstrating synchronization of a device with a community of peers in a wireless communication environment, according to some embodiments of the invention.

FIG. 3 is a flowchart demonstrating synchronization of a device with a community of peers in a wireless communication environment, according to some embodiments of the invention.

In operation 302, the device powers on or enters the environment and begins listening on one or more predetermined social channels for a periodic synchronization frame (PSF). It may be programmed with information regarding the default or possible periodicity of PSFs, and may therefore only need to listen on a given social channel for one of those periods in order to intercept a PSF broadcast by a master on that channel.

In operation 304, the device hears one or more PSFs and extracts their synchronization data. In the illustrated embodiment of the invention, all PSFs issued by masters synchronized to the same device hierarchy will advertise the same availability window sequence or schedule. The masters may transmit their PSFs on the same or different social channels, and may conduct the availability windows on the same non-social channels.

If the device did not hear any packet synchronization frame, it may assume that there is no master within range. Therefore, it may take on the role of master and begin issuing its own PSFs in order to synchronize other devices in range. As described in a following section, a master selection process is regularly or even continually applied to identify the devices that should be masters.

In operation 306, the device tunes its radio to the specified channel and attends the next availability window, assuming that its radio is not preempted by another application or service. If it cannot attend, the device will attend the next availability window that it can, although it may need to listen on a social channel again to receive the next set of synchronization data and learn its channel and starting time. The device may postpone attending an availability window until the start of the next sequence of windows, and therefore tune into the next required window.

In operation 308, during an availability window, a synchronization frame is broadcast by the master with which the device is now synchronized (e.g., a PSF or an MIF). This may relieve the device of the need to scan one or more social channels. The synchronization frame illustratively may be transmitted during an initial guard period or quiet period at the beginning of the availability window, during which slave devices may not transmit.

In operation 310, the device sets its presence mode if necessary or desired (e.g., if the device cannot attend the full sequence of availability windows). During at least the first availability window that it attends, and/or the first availability window having sequence number 0, the device identifies itself (e.g., address, name) in a message broadcast to all synchronized devices. It may advertise its presence mode at the same time.

In optional operation 312, the device may communicate directly with one or more of its synchronized peers during the availability window and/or out-of-band. As discussed above, the device may extend its attendance at the window one or more times in order to facilitate the communications, will advertise to its active peers if and when it must leave the window (e.g., to use its radio for some other purpose), and may arrange a separate rendezvous off-channel with another peer.

In some embodiments of the invention, traffic reduction or limitation measures may be implemented during some or all availability windows in order to reduce communication congestion and collisions. Illustratively, the master that controls the availability window sequence may specify when a measure is in place. In some implementations, traffic reduction measures are only applied during availability windows, and not during availability window extensions. In mandatory availability windows (i.e., availability windows having sequence number 0), traffic reduction measures may be mandatory.

By way of example, a device may be limited in the number of multicast frames it may transmit during one availability window (e.g., approximately three). Transmission of unicast frames may also be limited.

For example, unicast transmissions may only be permitted to (and/or from) devices having unknown presence mode values or values greater than one (or some other threshold). Limitations on unicast or multicast frame transmission may not apply to devices synchronizing among themselves (e.g., with a non-selection master) for a limited purpose, such as file transfer.

In operation 314, the device may power off its radio when not needed to listen for PSFs on a social channel or to attend an availability window.

The method of the invention depicted in FIG. 3 is merely illustrative, and does not limit methods according to other embodiments of the invention.

As described above, two or more peers may engage in their own synchronization, outside of or in addition to any availability window. For example, one of them may assume the role of a non-selection master and issue master indication frames or other synchronization frames during an availability window, to advise its peers as to when and where (i.e., time and channel) they may synchronize with it.

However, one peer may desire a short communication exchange with another peer without synchronizing. For example, a device synchronized with one hierarchy may wish to discover services offered by a peer (or peers) synchronized with a different (e.g., neighboring) hierarchy, may wish to poll a neighboring peer, etc. At least initially, they do not intend to engage in a significant exchange of data (e.g., as with a file transfer). Some embodiments of the invention provide this ability in the form of out-of-band inquiries and responses.

More specifically, a first peer may hear a synchronization frame of a neighboring hierarchy and thereby learn its schedule of availability windows. If able, it may attend one or more of the neighboring hierarchy's availability windows and thereby discover other devices. It may then send an out-of-band frame to one or more of the neighboring devices.

Figure 4:
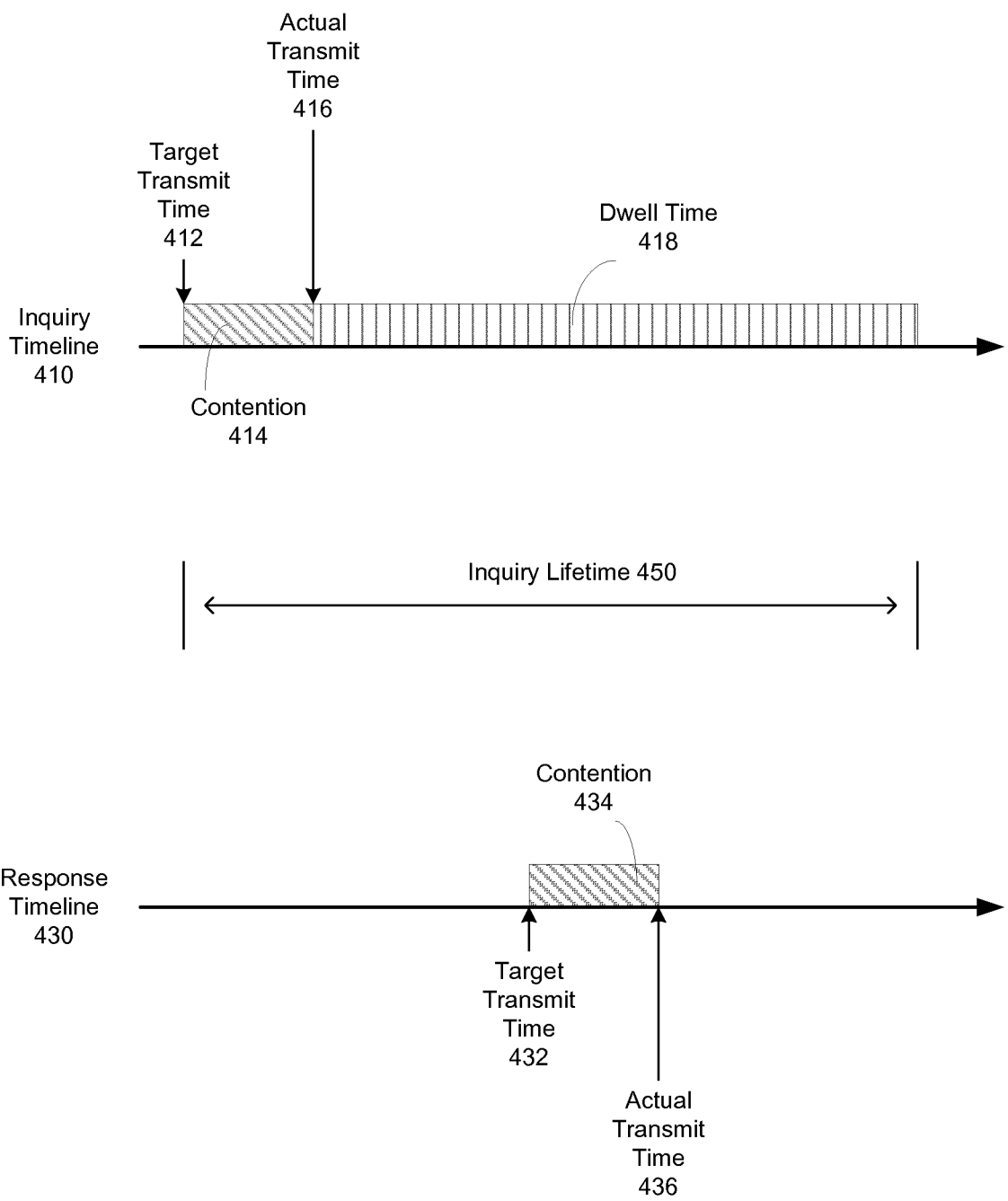
FIG. 4 is a diagram demonstrating an out-of-band exchange according to some embodiments of the invention.

FIG. 4 is a diagram demonstrating an out-of-band exchange according to some embodiments of the invention. As with the timing of periodic synchronization frames described above, the transmitting device must consider delay that will occur within itself, between the time it releases or prepares the inquiry for transmission and the time it is actually transmitted.

Inquiry timeline 410 reflects activity at the inquiring device, while response timeline 430 reflects activity at the responding device. When issuing the inquiry, the inquiring device must choose a suitable inquiry lifetime 450, such that the responding device will have time to receive, process and react to the inquiry.

In the illustrative inquiry and response, the inquiry is queued for transmission from the device at target transmission time 412. Because of contention for the antenna or the medium, and/or other delay (collectively represented as contention 414 in FIG. 4), the inquiry is not physically transmitted until actual transmit time 416.

Dwell time 418 is the remainder of the inquiry lifetime, during which the responding device must receive the inquiry and generate and transmit its response. The duration of dwell time 418 depends on the inquiry lifetime set by the inquiring device and the duration of contention 414. The responding device may also experience delay between its target transmit time 432 and the actual transmit time 436 of the response; this delay is represented as contention 434.

The inquiry may identify (in the out-of-band inquiry) any or all of the relevant time parameters (e.g., inquiry lifetime, target transmit time, actual transmit time, contention), so that the responding device can determine whether it will be able to respond before the inquiry expires. If not, it may drop the inquiry or abort its response. If the inquiring device does not receive a response during the inquiry lifetime, it may retry (e.g., with a longer lifetime), abandon the inquiry or take other action.

In some embodiments of the invention, a peer device may issue out-of-band inquiries to a master that it can hear, but which it is not synchronized to, in order to identify services offered by that master and devices synchronized to that master. In some implementations, it may relay information regarding other masters to its synchronized peers, such as during one or more of their availability windows. Information about another master (or other peer device) that may be revealed may include things such as a social channel it monitors, its availability windows (e.g., time, channel), master offset, services it offers, address, etc. An out-of-band inquiry may thus function as a quasi-PSF or quasi-MIF, in that it can allow a device to synchronize to the hierarchy of the sender of the inquiry.

Some unsynchronized masters (e.g., master devices to which no slaves or subordinate masters have synchronized) may adopt a low-power mode of operation. The master's low-power mode of operation may be indicated in its PSFs, or may be inferred by the sequence or schedule of availability windows and/or the presence mode advertised in the PSFs.

In one such mode of operation, an unsynchronized master may still send periodic synchronization frames, but provide short availability windows having long periods (e.g., multiple seconds). Because of the short, sparse nature of the availability windows, it may take some time for a peer to discover services offered by the unsynchronized master.

During synchronization of peers within a communication environment according to some embodiments of the invention, as the peers are organized into a hierarchy, slave (or leaf) devices synchronize with masters within range; those masters (and possibly other slaves) synchronize with a higher master, and so on, with one top master providing synchronization information for the entire environment. A configuration parameter of the environment may specify the maximum depth of the hierarchy, which may be defined as the number of levels or strata of masters.

By default, while the hierarchy is being organized, a peer device may issue periodic synchronization frames until it falls into position as a slave or leaf, at which time it ceases. A device may choose to be a slave, even if the master selection algorithm could otherwise make it a master.

All masters continue to issue PSFs to maintain synchronization within their areas, and do so with a periodicity that is a function of its level, or stratum, within the hierarchy. For example, the top master at stratum 0 may issue PSFs on the order of every 100 milliseconds (ms), a master at stratum 1 may issue PSFs on the order of every 150 ms, a master at stratum 2 may issue PSFs every 500 ms, and so on. These values are merely exemplary and in no way limit or restrict the duration of PSF periods; masters within different strata may employ the same period, and masters in the same strata may employ different periods.

A master's stratum may be reported within its PSFs, as part of selection metrics or as a separate information element. This information allows a listening device to determine how deep the hierarchy is within its area of the environment. Depending on that depth and/or other information (e.g., how many masters it can hear issuing PSFs, the maximum hierarchy depth), the device may be able to determine that it should be a slave or that it should continue issuing PSFs and remain a master.

A hierarchy's maximum depth parameter may be programmed into devices and/or advertised within periodic synchronization frames (e.g., as part of the master metrics or some other information element). Other restrictions may also be imposed, such as a maximum number of masters, a requirement that a master only continues in its role as long as it can hear no more than a threshold number of masters (e.g., within a particular range, at a particular stratum, overall), etc.

For example, where the hierarchy's maximum depth is D, a master situated at stratum $S \geq 1$ (i.e., all strata except the root) may only be allowed to hear D−S other masters operating in stratum S and still continue to serve as a master (assuming those other masters have higher or better selection metrics). This provision may allow for concentration of higher level masters near the top master, and dispersion of masters further away.

In some embodiments of the invention, a selection algorithm or process may prefer to retain an incumbent master over another device that would otherwise be given preference, unless the other device's selection metrics exceed the incumbent's by a threshold. This may help avoid excessive switching of masters. However, because a master's principal task is simply to broadcast synchronization data, switching masters does not impose a high transaction cost on the hierarchy.

When a device comes online in an environment and listens for PSFs, if it only hears from a master at the deepest or maximum stratum of the hierarchy, it may synchronize to that master (as a slave) or possibly take over for that master if the selection algorithm favors it. If, however, the device can also hear another master in a different hierarchy (e.g., as determined by the master metrics advertised in a periodic synchronization frame), it may favor joining that hierarchy if that other master is not at the maximum depth or stratum or if that other master has better selection metrics. In some embodiments of the invention, for the purpose of selecting masters, a device may simply ignore masters at depths greater than the maximum allowable depth of the hierarchy.

A device that can only hear other devices relatively deep in the hierarchy (e.g., high strata values), may be able to determine that it is at the fringe of the environment. If most or all of the other devices are already at the maximum depth, a new hierarchy may spawn, especially if a device with high selection metrics appears.

A new environment/hierarchy may also spawn when an existing one spans too large a spatial area. For example, a combination of the depth of the hierarchy, a measure of how close peer devices are and/or other factors, may cause a new hierarchy to be spawned. As discussed in the following section, signal strengths detected between peers may be one way of determining how close the peers are.

Requiring peers to synchronize only with masters relatively close to them may cause the hierarchy to be relatively compact. In contrast, a high limit on the maximum depth of the tree may allow the hierarchy to cover more area. By adjusting these (and/or other parameters), a suitable hierarchy may be formed.

Different parameters for configuring a hierarchy will be suited to different environments, depending on the density of devices, the communication load and/or other factors. For example, if the load is relatively light (e.g., the devices are low-power sensors), drawbacks associated with a hidden node problem should be limited and a relatively deep hierarchy may be implemented (e.g., on the order of ten to fifteen levels). Also, in sparser environments, a master selection process described below will resolve more rapidly.

The hidden node problem refers to a scenario in which multiple devices that are not in range of each other try to communicate with a common peer. Because they cannot hear each other's transmissions they cannot avoid them, and their communications to the common peer may collide. Although this may be exacerbated by the need to communicate during a relatively short period of time (i.e., within an availability window), the light load may help mitigate the problem and allow a deeper hierarchy than would be possible in a dense environment with a heavier load.

Without a hierarchical form of synchronization described herein, the total number of discovery frames needed to discover all devices in an environment could approach the square of the number of devices (i.e., each device might need to send at least one frame to every other device). These frames would be sent at random times and on any channels.

In contrast, the collective synchronization afforded by embodiments of the present invention enables synchronization based on regular transmissions from a select group of device (i.e., masters), and scales well. In a perfectly synchronized environment, the number of frames needed for all devices to discover each other is proportional to the number of devices. One discovery frame broadcast during an availability window having sequence number 0 will reach all other devices in range.

Selection of Master Devices

In different embodiments of the invention, different algorithms may be applied to determine which devices should be masters. However, the algorithm applied within a given environment is generally symmetrical, meaning that with the same data for each device being made available to its peers, each of those peers will come to the same conclusion regarding which devices should be masters and which has the "best" selection metrics and should be top master of the overall hierarchy.

In some embodiments, the specified selection algorithm is executed after each availability window (and any extensions to that window), or after some configurable number of availability windows. Prior to execution of the selection algorithm, each device assembles a list of masters that it detected (e.g., via PSFs), and each device's master preference value is calculated.

In one implementation, wherein all devices apply the same selection algorithm using the same selection parameters, the master having the highest preference value becomes the top master of the environment's hierarchy. A number of other masters are also selected, and the other devices become slaves. Every device, except the top master, synchronizes to either the top master or one of the other masters.

In some embodiments of the invention, besides being deployed at specific strata within the hierarchy, masters may be categorized relative to a given peer device by how close they are to that device. For example, in one implementation, a given device may characterize masters that it can hear as "close-range," "mid-range" or "far-range." Other ranges (more or fewer than three) may be used in other implementations.

Range estimates may be derived from signal strength indicators (SSI) and/or other indications of distance (e.g., GPS data). By way of illustration and not limitation, "close-range" may be defined as approximately 5 meters, "mid-range" may be defined as approximately 10 meters, and "far-range" may be defined as approximately 15 meters or further.

In some embodiments, devices first synchronize with the best close-range master—the master, within a distance defined as "close," that has the best selection metrics. Then the close-range master will attempt to synchronize with the best mid-range master (if one exists). Later, they will attempt to synchronize with the best far-range master. In other embodiments, only two ranges are used; devices first synchronize with the best close-range master, and then those masters synchronize with the best far-range master.

To avoid boundary conditions, a master device may need to be heard with at least a threshold RSSI (Received Signal Strength Indication) in order to be considered in the selection process.

The selection process may operate on a regular basis, such as after (or during) every availability window, after every complete sequence of availability windows or on some other schedule. A new device entering the communication environment may therefore usurp an existing master, a device that is a slave or a lower master in the hierarchy may move up (e.g., because other devices having better selection metrics have departed), other devices may move down from being a master to being a subordinate master or a slave, etc.

After a device assumes position as a slave or a master within the hierarchy, it will continue to listen to synchronization frames to determine if it is better suited to be a master than the master sending those frames. For example, it may repeatedly collect and process devices' selection metrics to determine whether and/or which other devices are better suited to be masters than the device itself.

As discussed earlier, slaves generally do not issue periodic synchronization frames, but masters will, and will include their selection metrics in those frames. However, slaves' selection metrics may be advertised during some availability windows (e.g., the mandatory windows) or with some other regularity.

In some embodiments of the invention, selection metrics of a device include factors and characteristics such as available power (e.g., battery strength), whether the device is connected to an AC power source, type of device, device configuration (e.g., features, resources), whether and how many applications or utilities require use of the device's radio, whether the device has multiple antennas and transceivers, whether the device can operate on multiple bands (e.g., 2.4 GHz and 5 GHz), processor load, transmission contention, presences mode and so on.

In these embodiments, the applicable master selection algorithm reduces the selection metrics to a value—a "master preference value"—that represents the corresponding device's suitability or preference to be a master, thereby allowing ready comparison of devices. Ties may be resolved by comparing network (e.g., MAC) addresses, IMSI (International Mobile Subscriber Identity), IMEI (International Mobile Equipment Identity) or some other unique characteristic of a device. In some implementations, a device may simply communicate its master preference value rather than its selection metrics. As discussed previously, the device may also report the selection metrics (or master preference value) of its top master.

As a device hears synchronization frames from different peers, it may assemble a list of possible masters that it hears and/or that are identified in the frames. This allows the device to periodically determine whether it should nominate itself to be a master and start issuing synchronization frames. Such a determination may depend on its selection metrics (or master preference value) versus those of the other devices, how many masters it hears, how far away those masters are, and/or other factors.

Figure 5A:
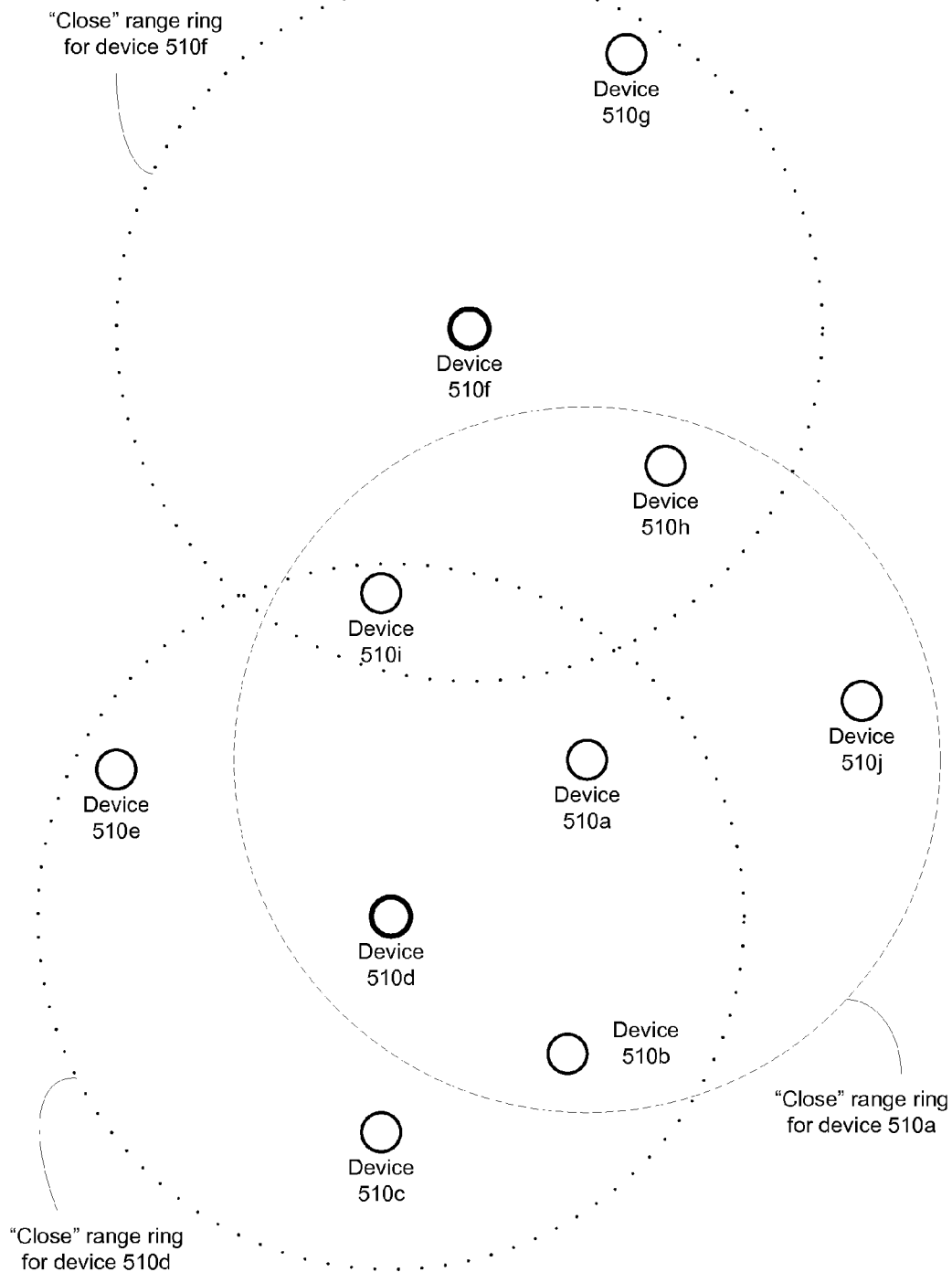
FIGS. 5A-D depict the selection of masters within a collection of peer communication devices, according to some embodiments of the invention.

FIG. 5A is a diagram of a collection of peer communication devices that may select masters and synchronize, according to some embodiments of the invention. In the illustrated scenario, peer devices 510 come online or enter their environment simultaneously or nearly simultaneously, thereby requiring all devices to determine suitable positions for themselves in the hierarchy.

When devices 510a-510j come online, they will listen on at least one designated social channel. This channel may be programmed in the device's firmware, may be programmed by a service provider as part of the provisioning process, or may become known to the devices in some other way.

They each listen for the duration of time equal to or greater than one known or default PSF period (e.g., 100 ms), during which a master would broadcast one periodic synchronization frame if a master were present. Because no other devices were present in the illustrated environment prior to the appearance of devices 510, they do not hear a PSF. In some implementations, a device may listen on multiple different social channels and/or may listen for a longer time (e.g., multiple PSF periods) before assuming that no master is present.

Because no master is detected, they all decide at virtually the same time that they should act as master, and therefore they all may issue PSFs at approximately the same time. As described in the preceding section, the PSFs advertise a sequence of one or more availability windows, specify which stratum they are operating at (in this case, stratum zero or the root), and also provide the issuer's selection metrics—such as power level, load, range, capabilities, etc.

For purposes of describing an embodiment of the invention, in FIG. 5A device 510*f* has the best selection metrics, followed by device 510*d*. The maximum depth of a hierarchy is two, meaning that there will be only two levels or strata of masters—the top master and one level of masters below it. All other devices will be slaves synchronized to the masters.

Because they all issue PSFs, all the devices will detect peers' periodic synchronization frames. Despite collisions, interference and retransmissions, each device will become aware that there are peers acting or attempting to act as master.

Each device will either continue to issue PSFs or will stop, depending on its selection metrics, other peers' metrics gleaned from the PSFs it hears and/or other factors. More specifically, the devices apply a predetermined selection algorithm or equation to reduce each device's selection metrics to a master preference value that easily can be compared between devices.

In the embodiment of FIG. 5A, a device may be programmed to automatically cease issuing PSFs if it hears a threshold number of masters (e.g., overall, within a particular stratum, within a particular range), especially if these other devices' have better or higher master preference value. In particular, all the devices assumed they were the first master, and so their PSFs will all indicate that they are at stratum 0 (i.e., the root). If the threshold of masters at that level is configured to be one, there can be only one top master, and as soon as a device hears one PSF from a peer operating at stratum 0 and having better selection metrics, it should stop issuing PSFs.

However, as described above, in some embodiments of the invention devices first synchronize with masters close to them, before the devices look further out. Therefore, they may at first only compare themselves (their selection metrics or master preference value) with devices they detect (e.g., based on RSSI) as being within close range (e.g., five meters).

A master selection algorithm or process may provide for a maximum number of masters within each of multiple ranges. A device competing to be the top master within a first range (e.g., "close" range) will cease competing (and stop broadcasting synchronization frames) when it recognizes a number of better qualified devices within that range that meets or exceeds the maximum number of masters for that range. Similarly, a device competing to be the top master within a second range (e.g., "far" range) will cease when it recognizes a number of better qualified devices within that range that meets or exceeds the maximum number of masters for that range.

By synchronizing first with a "close" master, the environment tends to aggregate into local clusters, at least initially. This can help reduce interference, and also reflects realistic situations, in which a user of a device is often sharing data with another user close to him or her, rather than someone further away. By subsequently looking further outward, clusters of devices can discover and synchronize with the larger environment.

In the environment depicted in FIG. 5A, two ranges are considered—"close" and "far." As discussed previously, categorization of a device as being close or far may depend on the strength of a signal between the two devices and/or other factors. In other embodiments, other ranges may be considered.

In FIG. 5A, "close" range rings are illustrated for the two devices with the best master selection metrics (devices 510*f*, 510*d*). The close range ring is also shown for an illustrative device that will not become a master—device 510*a*.

To continue the narrative from above, because every device understands that there can be only one master at the stratum currently being settled (stratum 0), they all cease issuing PSFs if there is a better master (e.g., a device with higher selection metrics) within close range. This means that within their respective close ranges, only devices 510*f* and 510*d* continue issuing periodic synchronization frames; each thus becomes top master within their close ranges. Therefore, in this illustrative scenario, two separate multi-peer hierarchies temporarily exist—one rooted at device 510*f* and one rooted at device 510*d*. As will be seen shortly, they will merge.

The other devices within range of these two masters synchronize to them and may begin attending their availability windows. Note that device 510*i*, which is within close range of both masters, synchronizes to device 510*f* because it advertises better selection metrics or a better master preference value than device 510*d*.

Now that each device recognizes its top master, each device that is not a level 0 master may determine whether it should bid to be a master at stratum 1. This determination may depend upon factors such as maximum depth of the hierarchy, how many other master candidates it hears at that level (if any), how close it is to the other master candidates, etc.

In embodiments of the invention reflected in FIGS. 5A-D, a configuration parameter for the environment may dictate that, at a given stratum or level, a device will assume that another master is needed (and that it can select itself as that master) unless it can hear some threshold of other masters at that stratum that have better selection metrics.

In the example depicted in FIGS. 5A-D, at stratum 1 and with the maximum depth of a hierarchy being 2 (e.g., two layers of masters, at strata 0 and 1), perhaps a device can only bid to become a stratum 1 master if it doesn't hear any other master at that stratum (or any other master within a particular range). In other words, there can be only one master at stratum 1. Any device that hears PSFs from a stratum 1 master will refrain from transmitting its own PSFs and bidding to become master, as long as that stratum 1 master has a higher master preference.

Therefore, in FIG. 5A, some devices other than devices 510*f* and 510*d* will issue PSFs advertising the same availability windows as their top masters (510*f*, 510*d*), but reporting their own stratum (i.e., 1) and their selection metrics. Devices that hear these peers' PSFs will halt their own bids to become level 1 masters if their selection metrics are worse, but will continue if they are better.

In the illustrated embodiment, devices first synchronize and organize a close-range hierarchy before any devices look further out. Therefore, at least one of devices 510*g*, 510*h*, 510*i* will become stratum 1 masters under top master 510*f*. Similarly, at least one of devices 510*a*, 510*b*, 510*c*, 510*e* will become stratum 1 masters under device 510*d*. Because they are currently only selecting close-range masters, and because of the distances between the peers, more than one stratum 1 master will actually be selected in the separate hierarchies.

Other devices that are in close range to the top masters but have insufficient master preference will be slaves and will remain synchronized with a master. The stratum 1 masters will extend the range of the hierarchy and help bring more devices into synchronization.

For example, device 510j, which is beyond close range for both device 510f and device 510d, may have established its own single node hierarchy. It will be recalled that all devices 510 came online simultaneously and started issuing PSFs nominating themselves as top master. Assuming that device 510j has better selection metrics than any devices close to it (e.g., devices 510a, 510h), it would continue beaconing even after they defer to other devices and cease issuing PSFs. Assuming further that the selection metrics of device 510j are lower than those of devices 510d and 510f, the close devices (e.g., devices 510a, 510h) will synchronize with devices 510d and 510f rather than with device 510j. Thus, device 510j temporarily forms its own environment and hierarchy.

Now, if either or both of devices 510a, 510h become a stratum 1 master, they will start issuing PSFs that advertise metrics of their top master. Device 510j will hear those PSFs and realize that a hierarchy rooted at a "better" top master is within range, and will therefore synchronize with the device advertising the best top master (i.e., device 510h if it can hear both 510h and 510a).

This scenario demonstrates that a device (e.g., device 510j) may synchronize with, and become a slave to, a peer having lower selection metrics or a lower master preference value (e.g., device 510h) if the device cannot directly hear the peer's master or if that master is beyond the range the device is currently focused on. If the slave were configured to look further out (e.g., to a "far" range), it may synchronize directly to that far-range master, or to a different device altogether. Alternatively, while acting as the top master of its own one-node hierarchy, device 510j may start listening for a better far-range master and synchronize with device 510f directly.

In some embodiments of the invention, in addition to considering how many masters a device can currently hear, the ranges of those masters may also be considered when the device determines whether it should cease attempting to be a master. For example, and as discussed above, a peer device may stop issuing periodic synchronization frames and defer to close-range peers having better selection metrics if it hears a first threshold number of such peers (e.g., one). In these embodiments, a peer device may also stop issuing PSFs, even if no better close-range master is heard, if it hears a second threshold of far-range peer devices having better selection metrics or better master preference values (e.g., three).

Figure 5B:
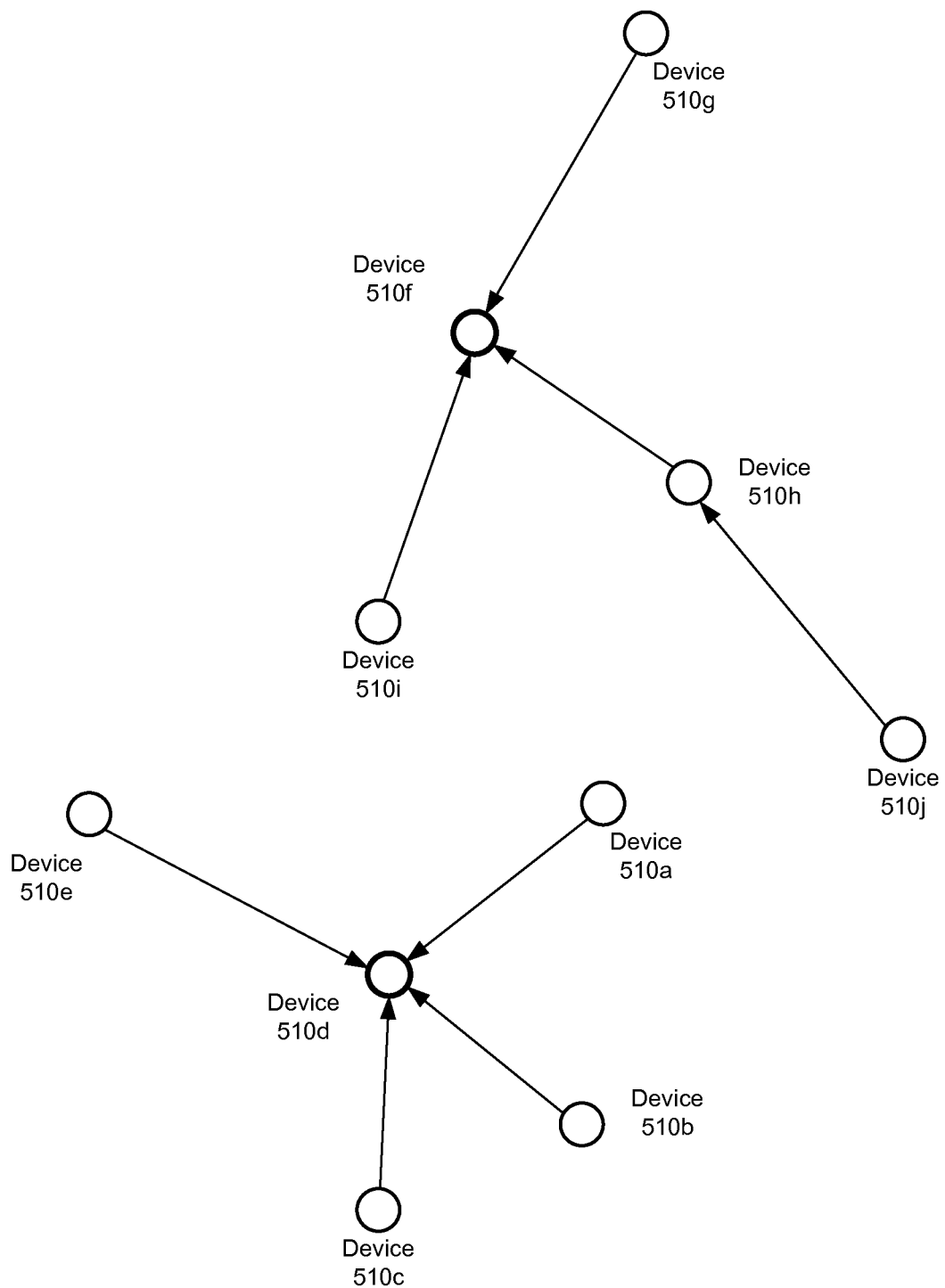

FIG. 5B is a diagram of the hierarchies that may result from the close-range synchronization and selection of master devices shown in FIG. 5A, according to some embodiments of the invention. Line segments represent synchronization, with arrowheads pointing to the master device that is issuing PSFs and managing availability windows.

Although multiple devices may be acting as stratum 1 masters and sending PSFs, in FIG. 5B only one of them (device 510h) has actually extended its hierarchy beyond the range of its top master. The synchronization and organization of devices depicted in FIG. 5B may be settled on the order of one second or one availability window from the time all devices came online. The duration of time required for all peers to settle into appropriate roles and strata will differ from implementation to implementation, depending on the number of devices, the frequency and duration of the availability windows during which the master selection algorithm is executed, and/or other factors.

In some embodiments of the invention, a synchronization tree or hierarchy such as that shown in FIG. 5B is not intended to be used for routing purposes, but rather to synchronize devices within an area so that they may communicate directly, in peer-to-peer fashion.

After synchronization at close range, in the illustrated embodiment of the invention top master devices (i.e., those at level 0—devices 510f, 510d) now look further out, to determine whether they should synchronize to a different master. For purposes of illustration, it may be assumed that "far" range is approximately twice the distance of close range.

In some other embodiments, all master devices listen for longer-range devices; slaves remain focused on close range. If they have insufficient selection metrics to become a master within a close range, there is little reason to have them to expend the effort to determine whether they should be a longer-range master. In yet other embodiments, all devices may listen for devices at longer range.

Figure 5C:
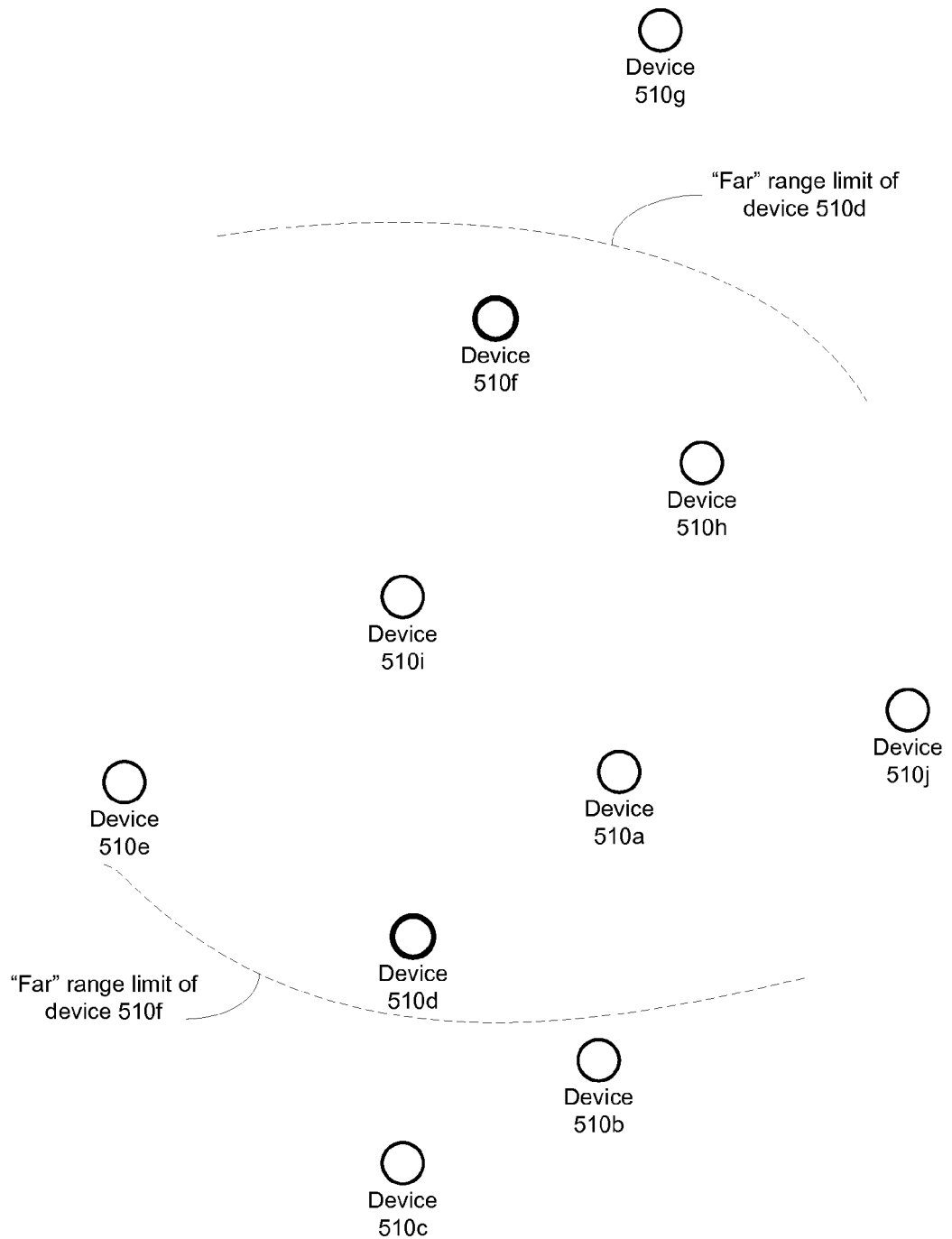

FIG. 5C shows the devices of FIG. 5A when far-range master selection and synchronization begins. Although complete range rings are not depicted in FIG. 5C, it may be assumed that the far range of device 510f encompasses all devices except devices 510b, 510c, and that the far range of device 510d includes all devices except device 510g. Therefore, all devices are within far range of at least one of the two top devices.

Master device 510f will continue issuing PSFs and advertising its sequence of availability windows unabated, because even at far range it doesn't hear any synchronization frames reporting a master having better selection metrics. Master device 510d, however, quickly learns that device 510f has a better master preference value. Device 510d may learn this directly from a PSF of device 510f or from a PSF issued by one of the devices 510h, 510i acting as stratum 1 masters under top master device 510f.

However, because device 510d does not hear any device in range better suited to be a stratum 1 master, it starts issuing PSFs advertising the schedule of availability windows dictated by top master 510f, announcing its position in stratum 1, and posting its own selection metrics and those of device 510f.

Other devices within close-range of device 510d that may have been acting as stratum 1 masters would hear device 510d and stop issuing PSFs as level 1 masters, because device 510d has the second highest master preference value, exceeded only by top master device 510f, and because the threshold number of better masters at which they must cease acting as master is one. In this illustrative environment, because the maximum depth of the hierarchy is two (i.e., strata 0 and 1), there will not be any masters at stratum 2.

Devices 510a, 510b, 510c, 510e will remain synchronized to device 510d, as slaves (none of them can be masters), but will adhere to the new availability window schedule promulgated by device 510f and now advertised by device 510d. In the illustrated embodiment of the invention, devices 510a, 510b, 510c, 510e do not listen for far-range devices, because none of them were level 0 masters, and therefore they do not synchronize directly with device 510f. In other embodiments in which they do listen for the best far-range master, they may synchronize directly with device 510f.

Device 510j had been synchronized with device 510h acting as a level 1 master. Because device 510h does not listen for far-range devices (it was not a level 0 master), it does not hear device 510d, and therefore it may still be the best level 1 master candidate within close-range. If so, device 510j remains synchronized with device 510h.

This leaves device 510g as the only device that does not hear the threshold number of stratum 1 masters. Because it was not a top master, it is still only listening for close-range devices. It will therefore begin sending PSFs similar to those of device 510*d*, placing itself in stratum 1 and announcing its selection metrics.

Figure 5D:
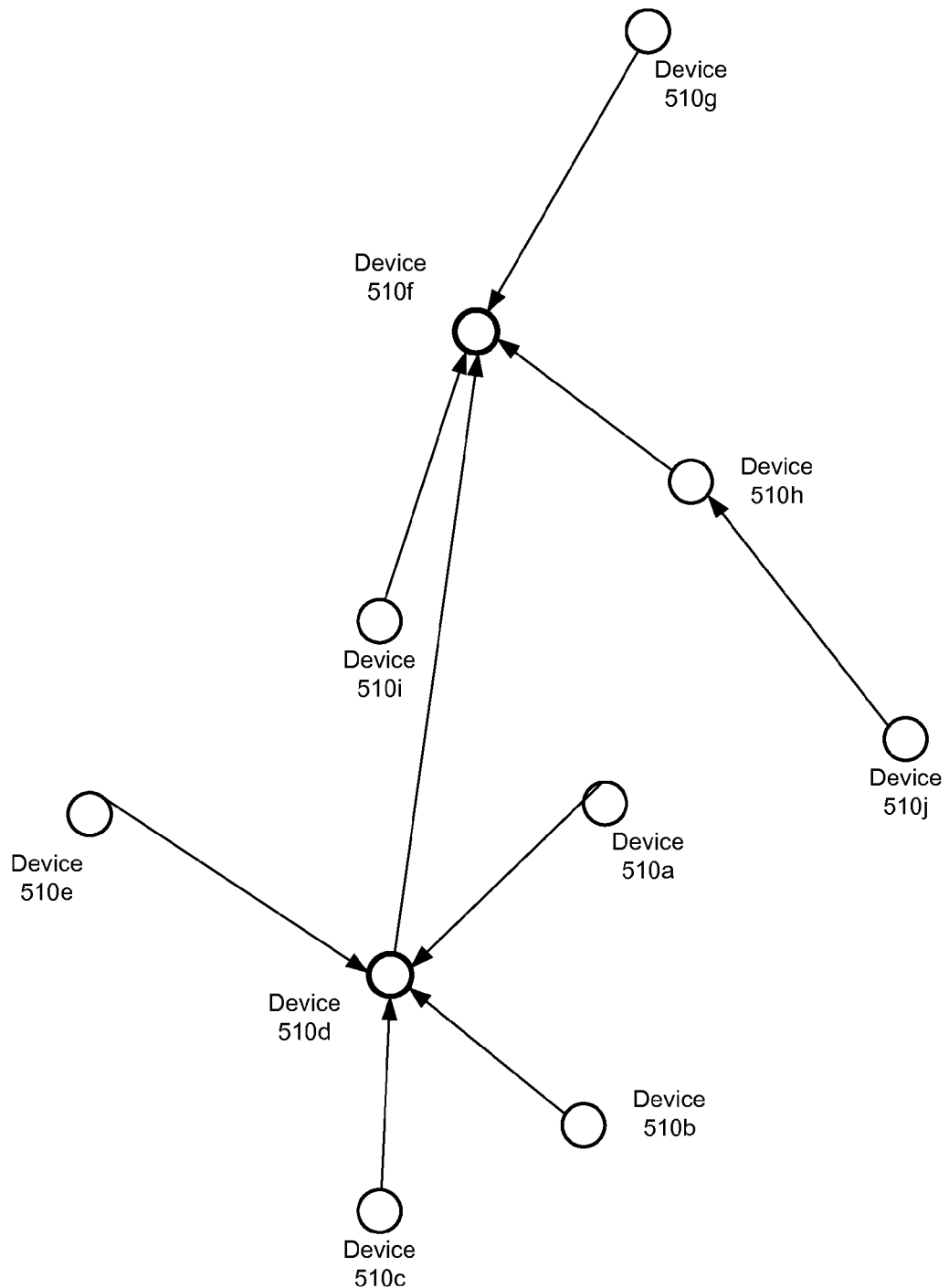

FIG. 5D depicts the hierarchy formed by merging the two separate hierarchies of FIG. 5B, according to some embodiments of the invention.

After an overall top master is selected, all masters in the hierarchy advertise the same schedule and sequence of availability windows. Therefore, synchronizing to one master instead of another within the same hierarchy makes little difference. However, devices must comply with any applicable environmental configuration parameters (e.g., maximum depth of hierarchy, maximum number of masters within a given range).

As shown in FIGS. 5A-D, in some embodiments of the invention peer devices first organize themselves into a close-range hierarchy. Shortly thereafter, these local clusters merge into a single synchronized environment. In the illustrated embodiment, just top close-range masters looked (or listened) beyond close range, and so few devices needed to change from being synchronized with one device to being synchronized with another. In another embodiment in which more (or all) devices look further out, more devices would likely change synchronization from their local or close-range master to a far-range master.

When a top master at close range looks beyond close range, based on its master selection metrics it may change strata by being promoted or demoted, or may remain at the same level. Sub-masters of that master may likewise change levels. For example, in an environment that provides for sufficient depth, if a top close-range master is demoted (or promoted) after it competes at longer range, its sub-masters may automatically be demoted (or promoted) by the same number of levels in order to maintain the relative organization.

As one alternative to this, however, after the top close-range master's new stratum is determined, its sub-masters may restart the selection process to determine the close-range hierarchy below that top close-range master.

In some embodiments of the invention, a peer device cannot arbitrarily nominate itself (e.g., by issuing PSFs) to be a master at just any level of the hierarchy. When a device hears a master, regardless of that master's stratum S, and assuming that master has a higher master preference value than the device, the device can become a slave to that device or, if it does not hear the threshold number of lower-level stratum S+1 masters, it may bid to become a master at level S+1.

Figure 6:
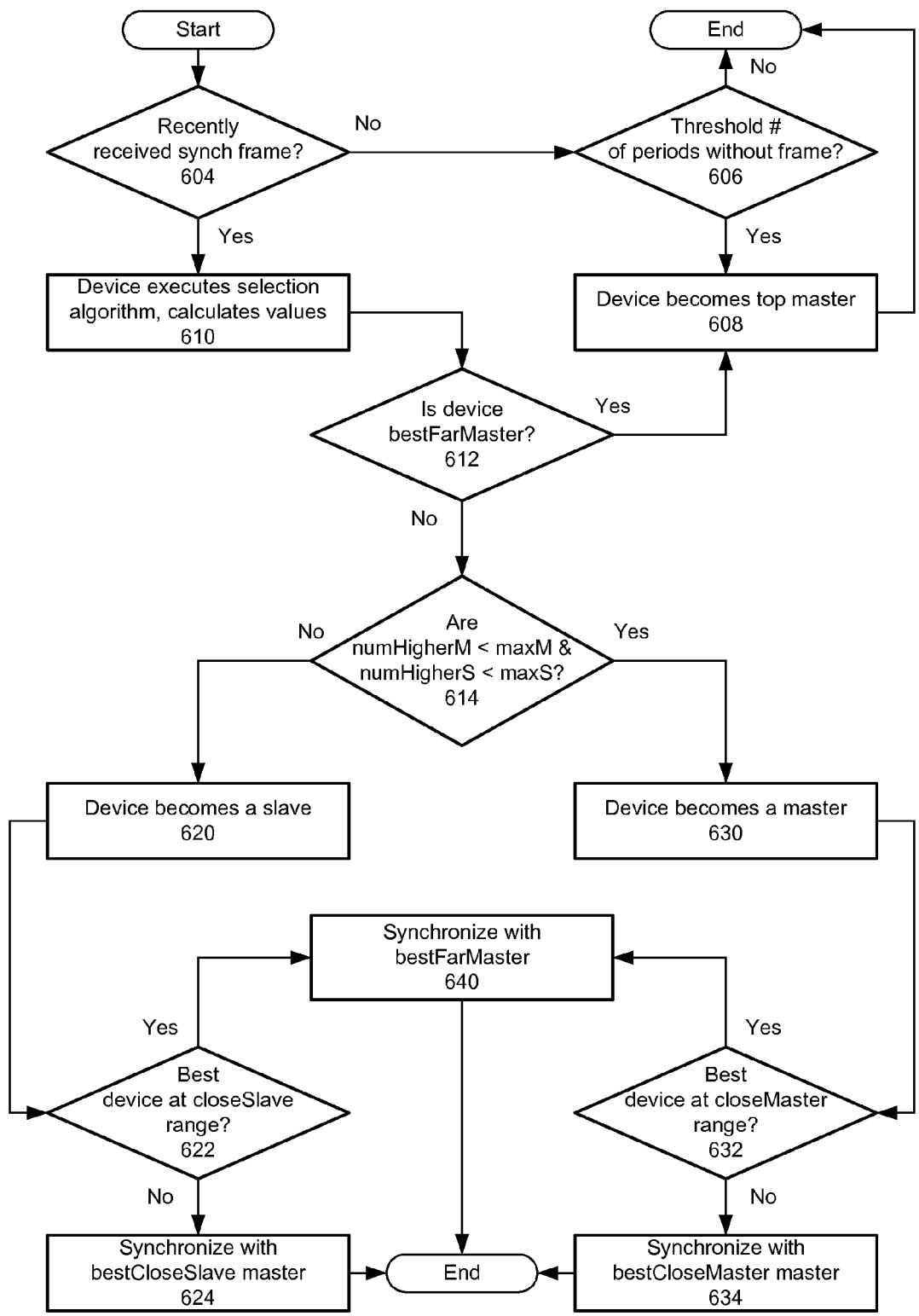
FIG. 6 is a flow chart demonstrating a method of selecting one or more masters in a peer-to-peer communication environment, according to some embodiments of the invention.

FIG. 6 is a flowchart demonstrating a method of selecting one or more masters in a peer-to-peer communication environment, according to some embodiments of the invention. The illustrated method may be executed before, during or after every availability window, after some subset of all availability windows (e.g., after the first or last window in the master's specified sequence), after some multiple of availability windows (e.g., after every two windows) or with some other regularity, and differs from the master selection process of FIGS. 5A-D.

In these embodiments of the invention, a slave device will synchronize with the best device that it hears with a signal strength greater than the signal strength corresponding to a range termed "closeSlave." A master device that is not the top master will synchronize with the best master that it hears within a "closeMaster" range, which corresponds to a different signal strength. In these embodiments, closeMaster range is greater than closeSlave range, meaning that the signal strength threshold associated with the closeSlave range is higher than the signal strength threshold associated with the closeMaster range. This promotes local clustering of slave devices, while a master is able to synchronize with a better master that is further away.

A "Far" range may be used to denote the furthest distance at which any device will listen. Thus, while the "Far" range is greater than both closeSlave and closeMaster ranges, the corresponding signal strength is lower than the signal strengths corresponding to those ranges.

In the illustrated process, if the best device that a given device hears at closeSlave range (if it is a slave) or at closeMaster range (if it is a master) is that device itself, it will synchronize with the best master device it hears at Far range. In some implementations, every device will keep track of the best master it hears at Far range and at either closeSlave or closeMaster range (whichever is appropriate), and will store (e.g., in memory) their synchronization parameters and master selection metrics.

Beyond the three ranges described above, which are used to identify which master a given device should synchronize with, other ranges may be used to help determine the given device's role (e.g., master, slave) or whether it should continue competing to be a master. For example, a device may track the number of masters that it hears within two ranges, termed ShortRange and MidRange.

In an illustrative implementation, ShortRange may be approximately one meter, closeSlave and closeMaster ranges may be on the order of four and five meters, Mid-Range may be between five and ten meters, and Far range may be approximately thirty meters. In other embodiments of the invention, a master selection process may consider fewer or additional ranges, which may extend virtually any distances and which may correspond to varying signal strengths.

Thus, one set of ranges (e.g., closeSlave, closeMaster, midSlave, midMaster, Far) may be used to determine what master device a given device will synchronize with. A different set of ranges (e.g., ShortRange, MidRange) may be used to identify the device's role.

In operation 604, a device determines whether it has recently received a synchronization frame (e.g., a PSF, an MIF) from the master with which it is synchronized. If one has been received within the last PSF period, or within some other applicable time period (e.g., an availability window period), the method advances to operation 610; otherwise, the method continues at operation 606.

In operation 606, the device determines whether a threshold number of availability windows or availability window time periods (or other applicable time periods) have passed without receiving a synchronization frame. If so, the method continues at operation 608; otherwise, the device maintains its current state and current synchronization and exits the illustrated method without executing the master selection process. Although no significant corrective action need be taken (because the number of missed PSFs has not hit the threshold), the device has not recently synchronized and may not have current master selection parameters to use to select a master.

In operation 608, the device becomes top master of the peer devices' hierarchy, but may maintain the previous top master's sequence or schedule of availability windows and PSF periodicity unless they conflict with other operation of the device. A goal when any master is replaced, including the top master, is to maintain synchronization within the environment; therefore, the preference is to continue with the same synchronization parameters if possible. After operation 608, the master selection process ends for the device.

In operation 610, the device begins executing the applicable master selection algorithm, using selection metrics that it has received via synchronization frames (e.g., PSFs, MIFs) and/or other metrics that it has heard from other devices (e.g., masters to which it is not currently synchronized) or that have been relayed by other devices. In particular, the device will compare its master selection metrics to those of other devices.

As described above, in some embodiments of the invention, masters are examined at different ranges. In these embodiments, the RSSI (Received Signal Strength Indication) of synchronization frames received from master candidates, or some other measurement of the strength of other devices' signals, such as RCPI (Received Channel Power Indicator), may be used to determine their range.

As part of operation 610, the device calculates several values relative to the device executing the method of FIG. 6, including the following (the ranges are described above):

| | |
|---|---|
| bestFarMaster | Identity (e.g., address) of best master within Far range |
| bestCloseSlave | Identity (e.g., address) of best master within closeSlave range |
| bestCloseMaster | Identity (e.g., address) of best master within closeMaster range |
| numHigherM | Number of masters within MidRange that have higher master preference values |
| numHigherS | Number of masters within ShortRange that have higher master preference values |

In comparing master preference values, in some embodiments of the invention the device will compare itself to each of one or more other devices it can hear, and rank itself in comparison to them, using the following rules.

Rule 1: If the device is the top master and the other device is in the device's tree (or vice versa), or if the device is a slave and the other device is the device's current master (or vice versa), then their master selection metrics (or master preference values) are compared. The device with higher metrics (or a higher preference value) wins and is ranked higher; if equal, their MAC addresses are compared and the higher (or lower) MAC address wins.

Rule 2: If Rule 1 does not apply and neither device is the top master, but they are in the same tree, the comparison depends on their strata. If they are in different strata, the device in the lower stratum (i.e., closer to the root) wins. If they are in the same stratum, the device with higher master selection metrics (or a higher master preference value) wins; if equal, their MAC addresses are compared.

Rule 3: If the devices are in different hierarchies (i.e., they do not have the same top master), the selection metrics (or master preference values) of their top masters are compared. The device whose top master has higher metrics (or a higher preference value) wins; if equal, their MAC addresses are compared.

Rules 1 and 2 promote stability of the synchronization hierarchy while generally establishing the shortest path from a given device to the top master of the hierarchy. Rule 3 ensures that two separate hierarchies in proximity to each other have the opportunity to merge into a single hierarchy.

In operation 612, the device determines whether it is bestFarMaster (i.e., has the highest master preference among all devices within Far range from the device). If so, the method returns to operation 608; otherwise, the method proceeds to operation 614.

In operation 614, the device determines whether numHigherM (i.e., the number of masters within MidRange that have higher master preference) is less than a threshold or maximum number of MidRange masters (maxM), and whether numHigherS (i.e., the number of masters within ShortRange that have higher master preference) is less than a threshold or maximum number of ShortRange masters (maxS). If so, the method advances to operation 630; otherwise, the method continues at operation 620.

In some embodiments of the invention, the method may advance to operation 630 from operation 614 if either numHigherM is less than maxM or numHigherS<maxS (i.e., an "or" operation is performed instead of an "and" operation).

In operation 620, the device appoints itself as a slave, because even if it has a higher master preference value than some other devices, a threshold number of masters within ShortRange that have higher values are already in position. If the device had been issuing periodic synchronization frames, it ceases.

In operation 622, the device determines whether it is the best device within closeSlave range (i.e., the best master candidate within closeSlave range). If so, the method advances to operation 640; otherwise, it continues at operation 624.

In operation 624, the device synchronizes with bestCloseSlave (i.e., the best master within closeSlave range). The method then ends.

In operation 630, the device assumes the role of a master. This will require it to issue periodic synchronization frames and manage a sequence of availability windows to synchronize other peer devices.

In operation 632, the device determines whether it is the best device at closeMaster range (i.e., the best master candidate within closeMaster range). If so, the method advances to operation 640; otherwise, it continues at operation 634.

In operation 634, the device synchronizes with bestCloseMaster (i.e., the best master within closeMaster range). The method then ends.

In operation 640, the device synchronizes with bestFarMaster (i.e., the best master candidate within far range), which may be the top master. The method then ends.

FIGS. 7A-E depict execution of the master selection process of FIG. 6 according to some embodiments of the invention.

Figure 7A:
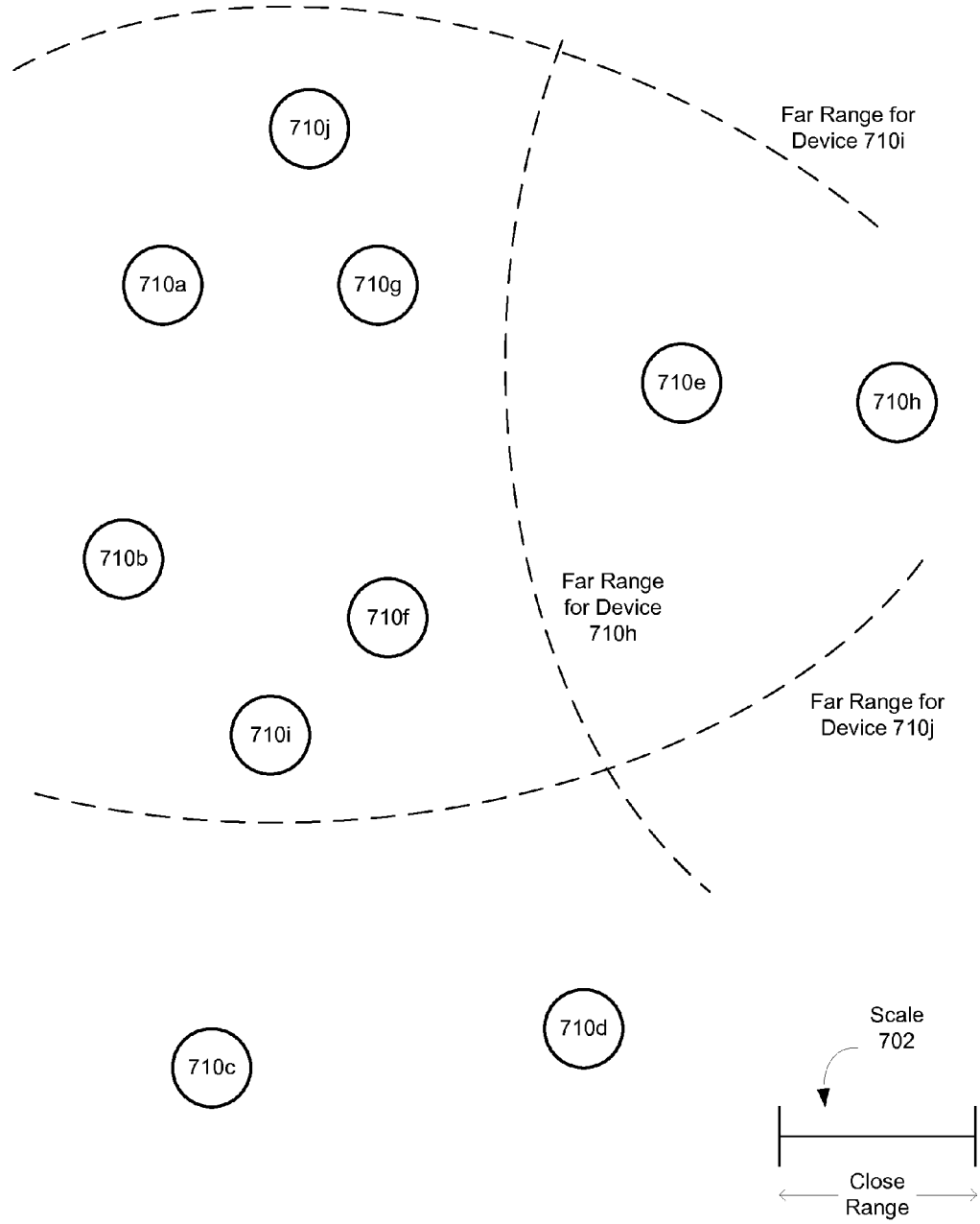
FIGS. 7A-E depict execution of the master selection process of FIG. 6, according to some embodiments of the invention.

FIG. 7A illustrates a collection of peer devices distributed within an environment. Device labels indicate the devices' rankings in order of their master selection metrics (and their MAC addresses if two devices' metrics tied), wherein device 710a<device 710b<device 710c< . . . <device 710i<device 710j. Thus, of all the devices in the environment, device 710j has the best or highest master selection metrics.

As discussed above, multiple different ranges are relevant to the selection of masters and synchronization of the devices. Limits of "far" ranges for the top three devices (devices 710h, 710i, 710j) are shown in FIGS. 7A-E, along with scale 702 demonstrating an illustrative "close" range. In the illustrated embodiment, closeSlave and closeMaster ranges (as described above with regard to FIG. 6) are equal and represented by scale 702.

Figure 7B:
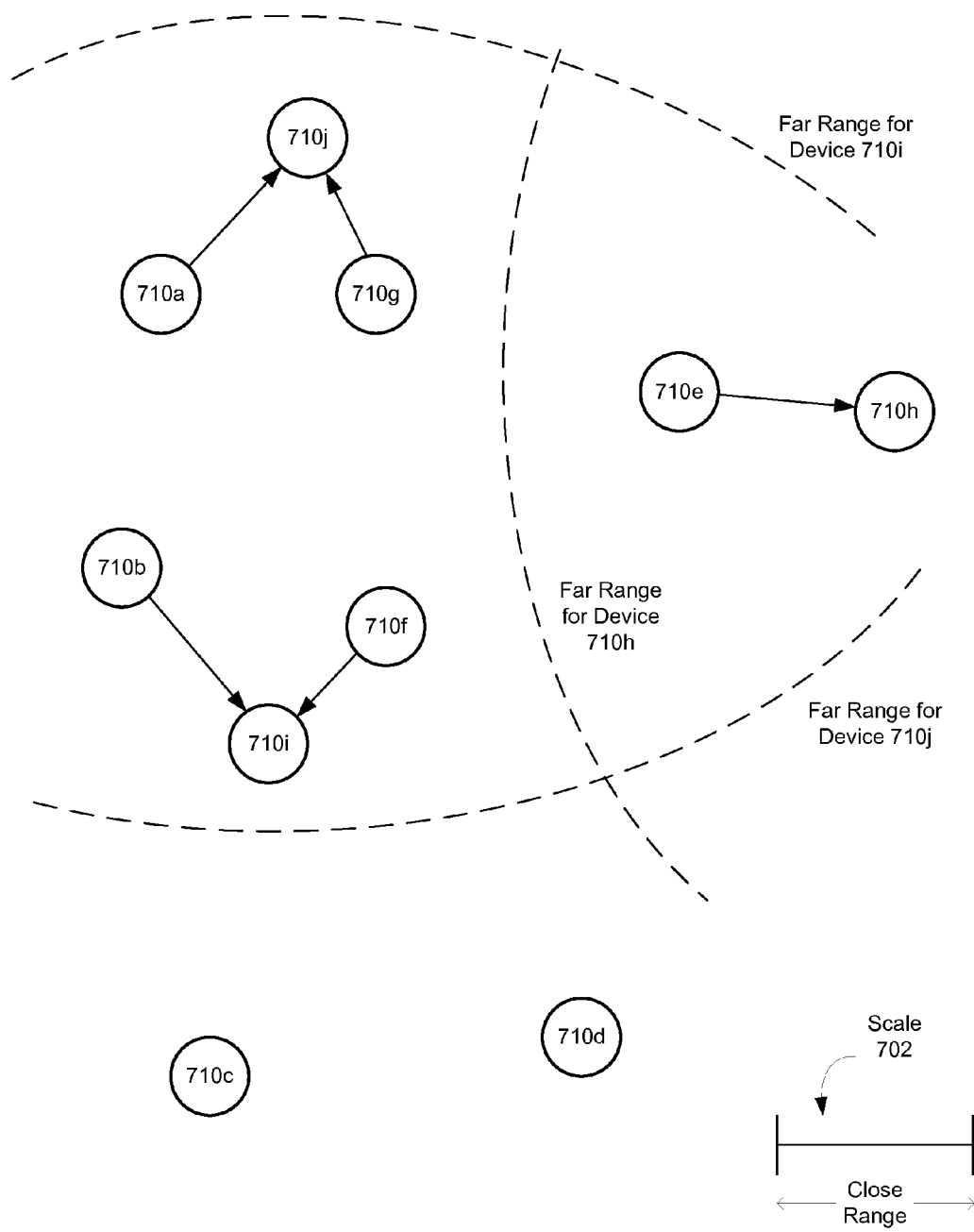

FIG. 7B illustrates the close-range connections that are established when each device synchronizes with the closest master it can hear (e.g., in operation 634). In the illustrated scenario, most devices are within close range of one of the top three devices, and therefore synchronize with one of those devices. Devices 710c, 710d, however, find no other devices within close range, and therefore continue unsynchronized for now (i.e., in their own one-device hierarchies).

It may be noted that some devices (e.g., devices 710*b*, 710*e*, 710*f*) can hear better masters than those they initially synchronize with, but are only looking for the closest master, not the best master they can hear. Also, all devices may still be sending synchronization frames, because no device has yet found reason to become a slave.

Figure 7C:
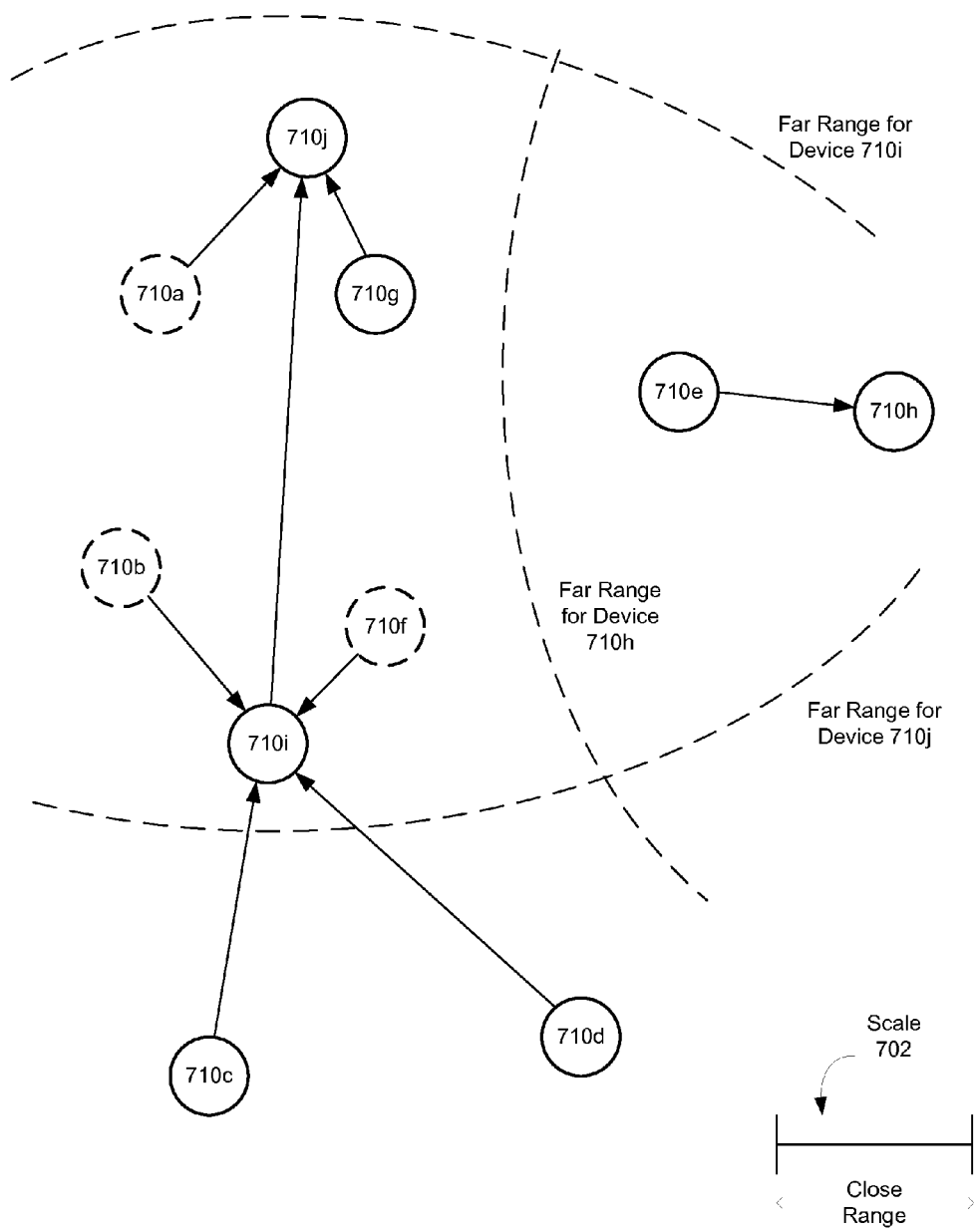

FIG. 7C depicts the environment as masters listen for and connect to better masters at far range. For example, and according to the method illustrated in FIG. 6, devices 710*c*, 710*d*, 710*i* became masters at operation 630, discovered they were the best masters within close range in operation 632, and then implemented operation 640, wherein they synchronized with the best master within far range. Thus, device 710*i* synchronizes with device 710*j* and devices 710*c*, 710*d* synchronize with device 710*i*.

Also, some devices now transition to slave status because they hear threshold numbers of masters (i.e., masters having better selection metrics) at short and/or mid-range. For example, and following the method depicted in FIG. 6, devices 710*a*, 710*b* (and/or others) reach operation 614 and determine how many masters they hear at short range and at mid-range. One or both of these values equal to or exceed their thresholds, and so the devices implement operations 620, 622 and 624 to become slaves synchronized to the best master within closeSlave range. Illustratively, both short range and mid-range are longer distances than close range, but less than far range.

The dashed outlines of devices 710*a*, 710*b* and 710*f* indicate that they are now slaves. Because they are slaves, they cease issuing packet synchronization frames.

Also with reference to FIG. 7C, non-slave devices commence or continue issuing synchronization frames advertising their master selection metrics and the selection metrics of their top masters. For example, device 710*e* will advertise selection metrics of devices 710*e* and 710*h*, and device 710*g* will advertise selection metrics of devices 710*g* and 710*j*.

Figure 7D:
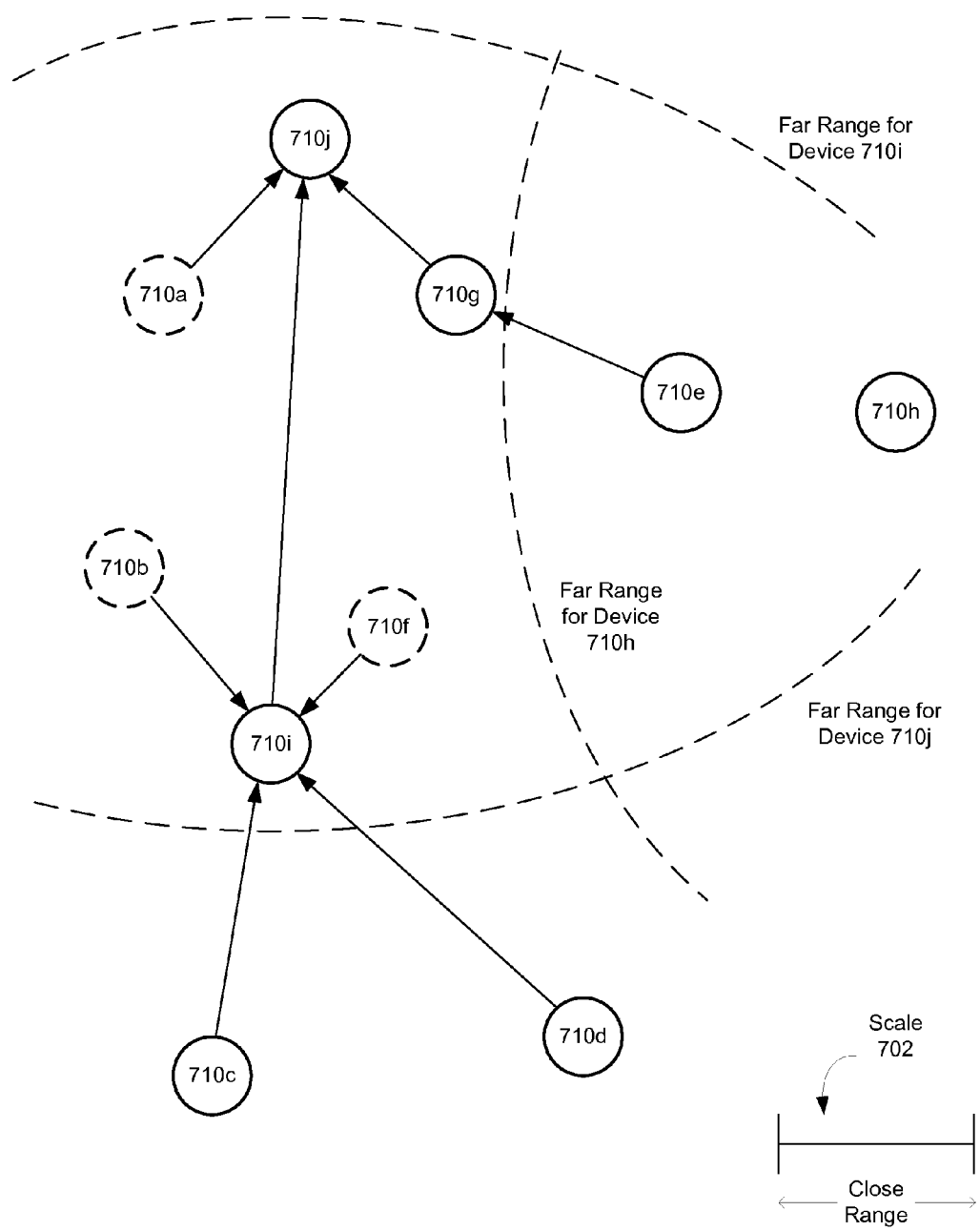

FIG. 7D depicts the environment after device 710*g* is physically moved closer to device 710*e*, but still beyond the far range of device 710*h*. In particular, device 710*g* moves within close range of device 710*e*.

Via synchronization frames, device 710*g* is advertising its selection metrics and those of device 710*j*. When device 710*e* compares metrics as part of the master selection process, it will note a preference for device 710*j* over device 710*h*. Therefore, device 710*e* will now synchronize with device 710*g*.

Figure 7E:
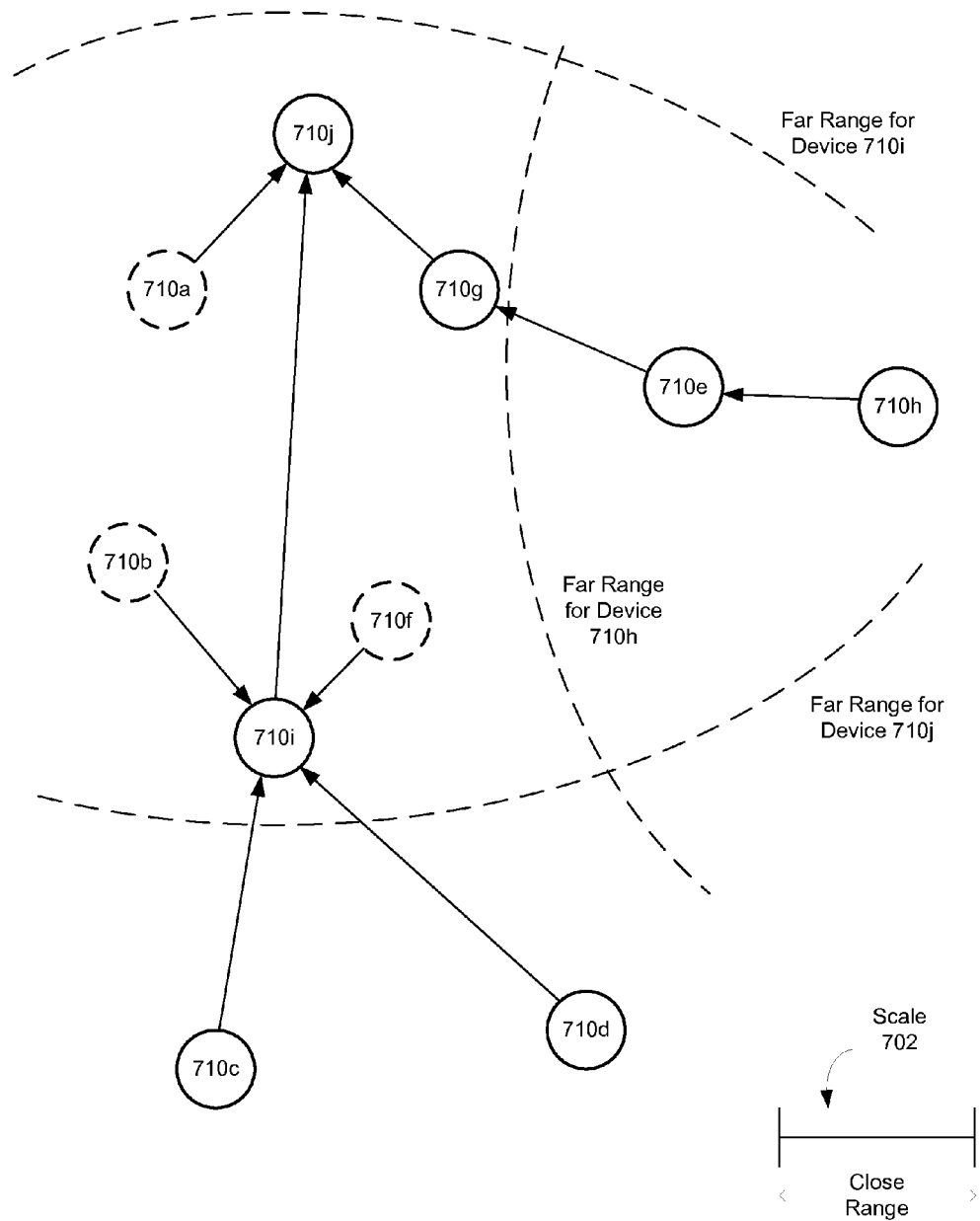

In FIG. 7E, device 710*e* has begun issuing synchronization frames advertising its selection metrics and those of its new top master, device 710*j*. Device 710*h* will compare the metrics (or master preference value) of device 710*j* to its own, and see that device 710*j* is the preferred master.

Device 710*h* may therefore synchronize with the extended hierarchy of device 710*j* if, as shown in FIG. 7E, the maximum depth parameter of the hierarchy permits. If device 710*e* was at the maximum depth of the hierarchy, then device 710*h* would begin its own hierarchy.

In some embodiments of the invention, a master selection algorithm or process is continuous. In these embodiments, the process restarts with every availability window, and may therefore take some time before all devices are placed at their "correct" level in the hierarchy. As devices move into, within and out of the environment, the hierarchy may continually change.

However, it should be noted that synchronization of devices happens much more quickly and will not be degraded by the ongoing master selection process. That is, synchronization does not depend on having every device in its correct logical position.

In particular, even though the devices acting as the root of the hierarchy (i.e., the overall top master) and as other masters may change over time, this will not interrupt synchronization in most implementations. In these implementations, the same availability window is applied throughout the hierarchy and therefore any device newly assuming the root position (or other master position) will already be synchronized with the other devices and they will be synchronized with it.

In some embodiments of the invention, comparison of devices' master selection metrics involves comparing their transmission ranges and their power levels. As a simple example, a device with higher transmission power or range will have preference to be a master over all devices having less transmission power/range.

If transmission powers/ranges are not available (or if there is a tie between devices), the device having the highest remaining battery charge will be preferred. If both transmission range and battery charge are unknown (or tie), devices' MAC addresses (or other addresses/identifiers) may be compared.

Because selection of masters is a continuous process in these embodiments, the cost of being a master (e.g., power usage) is shared among different peers. As one master's power level decreases (e.g., because of regularly issuing periodic synchronization frames), another device will take its place.

In other embodiments, other metrics may be considered. As described previously, these master selection metrics, and/or a simple master preference value representing a combination of the metrics, are advertised by devices when they broadcast synchronization frames.

A Peer Device

Figure 8:
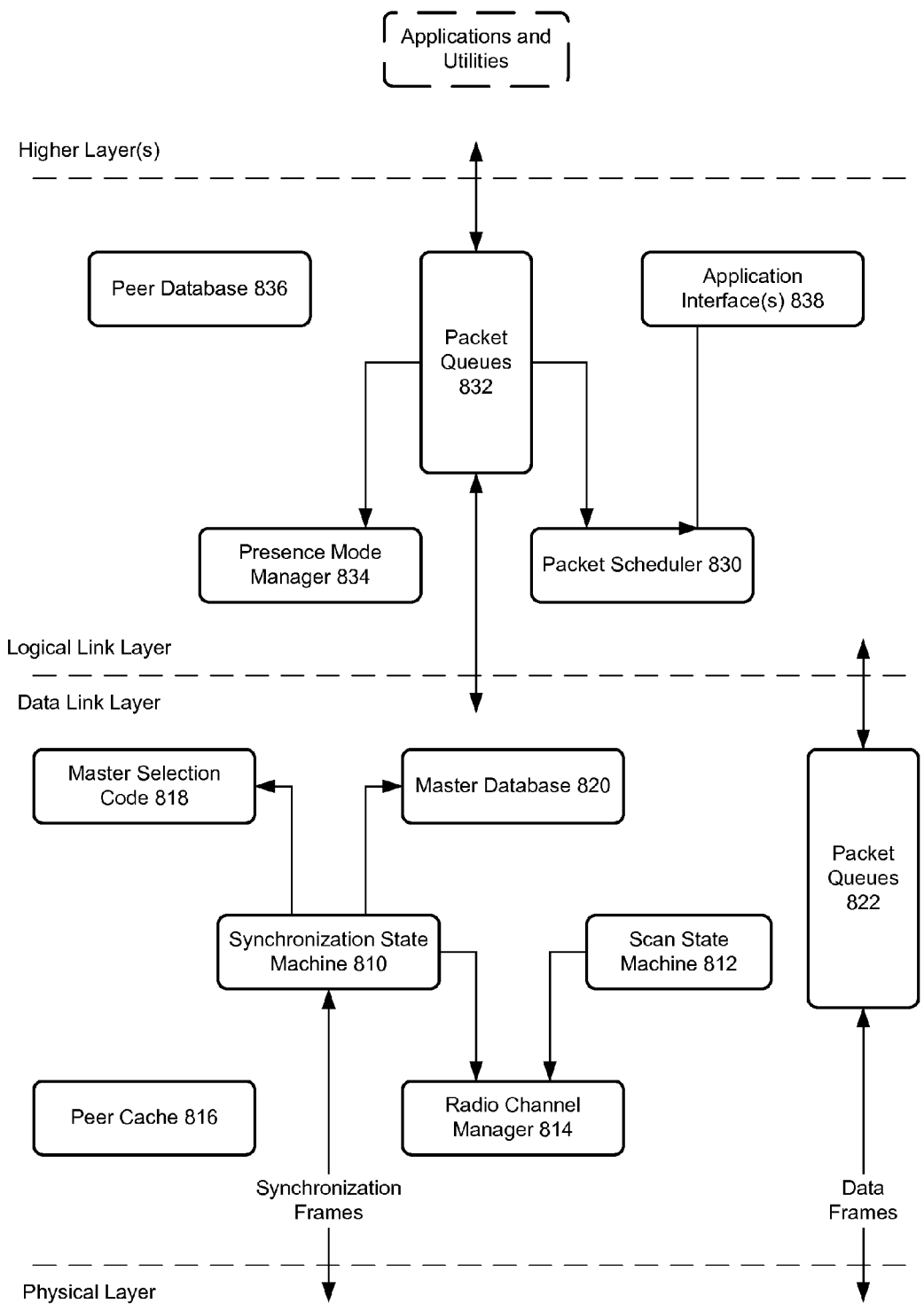
FIG. 8 is a block diagram of a peer device, according to some embodiments of the invention.

FIG. 8 is a block diagram of a peer device, according to some embodiments of the invention. Two primary protocol layers or operating layers are depicted in FIG. 8—the Logical Link Layer and the Data Link Layer. Above the logical link layer one or more applications and/or utilities (e.g., mDNS, Bonjour) may operate; below the data link Layer is the Physical Layer, responsible for transmitting frames over, and receiving frames from, the transmission medium. In some embodiments of the invention, the Logical Link layer and Data Link layer may be physically implemented by separate processors or by integrated circuits residing on a single component.

Within the data link layer, synchronization frames (e.g., periodic synchronization frames or PSF, master indication frames or MIF) are issued by and/or received by synchronization state machine 810. Incoming synchronization frames are routed to master database 820 and then passed upward to the logical link layer. Data frames are handled by packet queues 822.

Synchronization state machine 810 has two modes—slave and master—and runs continuously in some implementations. As discussed earlier, a master device is a device that issues periodic synchronization frames, while a slave device does not, but is synchronized with a master.

The state machine is responsible for synchronization of the peer device to its current master (e.g., if the device is a slave). If the device is a master, state machine 810 manages its transmission of periodic synchronization frames and/or master indication frames, and also manages its availability window presence.

Scan state machine 812 scans social channels for periodic synchronization frames. Radio channel manager 814 manages radio resources (e.g., a shared antenna) with other entities (e.g., an infrastructure module) and between different radios (e.g., Wi-Fi, Bluetooth). Synchronization state machine 810 interacts with radio channel manager 814 to switch the device's radio to the correct channel for an availability window, at the appropriate time. Scan state machine 812 and/or other components of the device may interact with the radio channel manager for other purposes (e.g., scanning a channel for new devices).

Peer cache 816 stores relevant information of a limited number of other devices with whom the host peer device is communicating or is about to communicate. Use of this cache may help alleviate problems associated with memory restrictions in some hardware/firmware implementations. For example, the Data Link Layer may be implemented by a dedicated Wi-Fi chipset, which typically does not have access to large memory banks Information in peer cache 816 is synchronized with information in peer database 836.

Master selection code 818 is periodically executed to perform master selection, using information from peer database 836 and/or other information. For example, execution of the code may cause a ranking of devices in master database 820, based on their suitability to be a master.

Master database 820 stores data regarding all masters that the peer device is aware of. Such data may be used for synchronization and/or master selection, and may include, but is not limited to, RSSI (e.g., of latest frame, average of multiple frames, minimum, maximum), master selection metrics and synchronization parameters.

In some embodiments of the invention, master database 820 is populated or updated, and master selection code 818 executed, upon receipt of every periodic synchronization frame.

Packet queues 822 of the data link layer stores incoming and/or outgoing data frames. Packet queues 832 of the logical link layer store peer traffic incoming from, and outgoing to, other devices.

Packet scheduler 830 schedules multicast, broadcast and unicast traffic to synchronized devices, and out-of-band inquiries/responses to masters with which the peer is not synchronized ("non-synchronized masters") and to devices synchronized with non-synchronized masters. The peer database stores information regarding the non-synchronized masters' availability windows, presence modes and other timing-related information.

Presence mode manager 834 controls the peer device's presence mode, based on factors that may include, but that are not limited to: current active data links to synchronized devices, current data rates to those devices, scan requirements, out-of-band inquiry requirements, power management state, Bluetooth requirements, other radio requirements, etc.

Peer database 836 identifies all devices known to the peer device illustrated in FIG. 8, and stores information regarding each device. This information may include, but is not limited to, its root master, other masters, master selection metrics, capabilities (e.g., supported frequency bands, channel bandwidths, modulation/data rates), presence mode, services supported by the device, outstanding block ACK agreements, and so on.

Application interfaces 838 include interfaces to higher system layers and modules, which may include but are not limited to: configuration and network management, a GUI (Graphical User Interface), service advertisement and discovery, and so on. The GUI may present a device user with a list of surrounding peers, their physical proximities, range or signal strengths, lists of their service, and/or other information.

The configuration of the peer device presented in FIG. 8 is exemplary. In other embodiments of the invention a peer device's configuration may differ to varying degrees.

Some embodiments of the invention promote coexistence of a peer-to-peer communication protocol, as described herein, with other applications that require the radio or other communication resources of a peer device. For example, the device may operate an application or another protocol, such as Bluetooth®.

In these embodiments, Bluetooth communications can be performed as desired, except during the device's availability window and any extensions thereto. Outside of the availability window, Bluetooth scans, inquiries and/or other operations are allowed, and may even take priority over data frames adhering according to a protocol provided here.

A master's periodic synchronization frame may be delayed because of a Bluetooth (or other application/protocol) operation using the device's antenna, but normally will not be dropped. Bluetooth or other operations may not be permitted during out-of-band inquiries and responses.

Synchronization and operation of peer devices as provided herein can also coexist with an application or protocol that relies on some communication infrastructure (e.g., an access point) not part of the peer device hierarchy.

The environment in which some embodiments of the invention are executed may incorporate a general-purpose computer or a special-purpose device such as a hand-held computer, smart phone or other mobile device. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. An apparatus for synchronizing with multiple peer devices in a peer-to-peer communication environment, the apparatus comprising:
a hardware processor;
a communication module for communicating wirelessly, coupled to the processor, wherein the processor is configured to:
identify a sequence of availability windows having associated communication channels and associated times, wherein to identify the sequence of availability windows, the processor is configured to:
receive, from a first master peer device, a synchronization frame, the synchronization frame comprising:
synchronization parameters comprising a channel, a time, and a duration for each availability window in the sequence of availability windows; and
selection metrics of a second master peer device to which the first master peer device is synchronized; and
identify the sequence of availability windows based at least in part on the synchronization parameters; and
discover the multiple peer devices during one or more of the availability windows.

2. The apparatus of claim 1, wherein the processor is further configured to:
tune the communication module to a predetermined social channel; and
receive a synchronization frame broadcast on the predetermined social channel.

3. The apparatus of claim 1, wherein the processor is configured to power off the communication module except during the availability windows.

4. A method of synchronizing with peer devices in a peer-to-peer communication environment, the method comprising, at a first device:
detecting a synchronization frame issued by a first master peer device;
extracting from the synchronization frame:
information identifying a sequence of one or more availability windows during which a peer device will be available for communication, wherein each identified availability window has an associated communication channel and an associated time; and
selection metrics of a second master peer device to which the first master peer device is synchronized;
synchronizing with the first master peer device by attending a first availability window identified in the synchronization frame; and
during the first availability window, transmitting a communication to identify the first device to one or more of the peer device.

5. The method of claim 4, further comprising:
exchanging electronic communications with the peer device during the first availability window; and
extending the first availability window to continue the electronic communications.

6. The method of claim 4, further comprising, during the first availability window:
mutually discovering one or more peer devices.

7. The method of claim 4, further comprising, during the first availability window:
scheduling a rendezvous with the peer device outside of the availability windows identified in the synchronization frame.

8. The method of claim 4, wherein the first device attends the first availability window by tuning a wireless communication module to the communication channel associated with the first availability window at the time associated with the first availability window.

9. The method of claim 4, wherein:
the synchronization frame is detected on a first channel; and
the communication channel associated with the first availability window is different from the first channel.

10. The method of claim 4, further comprising:
during the first availability window, receiving an additional synchronization frame issued by the first master peer device.

11. The method of claim 4, further comprising:
during the first availability window, receiving an additional synchronization frame issued by a peer device other than the first master peer device.

12. The method of claim 4, further comprising:
extracting from the synchronization frame one or more of:
selection metrics of the first master peer device; and
a master preference value of the first master peer device.

13. A non-transitory computer-readable medium having instructions stored therein, which, when executed by a computer, cause the computer to perform operations, the operations comprising, at a first device:
receiving a synchronization frame issued by a first master peer device;
extracting from the synchronization frame:
information identifying a sequence of one or more availability windows during which a peer device will be available for communication, wherein each identified availability window has an associated communication channel and an associated time; and
selection metrics of a second master peer device to which the first master peer device is synchronized; and
synchronizing with the first master peer device by attending a first availability window identified in the synchronization frame, wherein the first availability window is on a different communication channel than the communication channel in which the synchronization frame is received.

14. The apparatus of claim 1, wherein the processor is further configured to:
receive, from each of two or more peer devices, another synchronization frame, each another synchronization frame comprising synchronization parameters including another sequence of availability windows for a corresponding peer device of the two or more peer devices;
select one of the two or more peer devices as a third master peer device; and
wherein to identify the sequence of availability windows, the processor is configured to identify the another sequence of availability windows for the third master peer device based at least in part on the synchronization parameters.

15. The apparatus of claim 14, wherein to select the one of the two or more peer device as the master peer device, the processor is configured to:

acquire, from the synchronization frames, selection information identifying characteristics of the two or more peer devices;

compare, based at least in part on the selection information, each peer device to others of the two or more peer devices; and select one of the two or more peer devices as the master peer device based at least in part on a result of the comparing.

16. The apparatus of claim 1, wherein to discover the multiple peer devices during the one or more of the availability windows, the processor is configured to:

receive, during the one or more of the availability windows, a communication identifying at least one of a peer device of the multiple peer devices, or a service provided by the peer device of the multiple peer devices.

17. The apparatus of claim 1, wherein to discover the multiple peer devices during the one or more of the availability windows, the processor is configured to:

receive a master indication frame (MIF), the MIF comprising information that enables communication with one or more of the multiple peer devices outside of an availability window.

18. The apparatus of claim 1, wherein each peer device of the multiple peer devices attends at least one of the sequence of availability windows.

* * * * *